United States Patent
Zhang et al.

(10) Patent No.: US 8,510,805 B2
(45) Date of Patent: Aug. 13, 2013

(54) SAFE AND EFFICIENT ACCESS CONTROL MECHANISMS FOR COMPUTING ENVIRONMENTS

(75) Inventors: Xinwen Zhang, San Jose, CA (US); Jean-Pierre Seifert, Pettneu am Arlberg (AT); Onur Aciicmez, San Jose, CA (US); Afshin Latifi, San Jose, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 1273 days.

(21) Appl. No.: 12/108,455

(22) Filed: Apr. 23, 2008

(65) Prior Publication Data

US 2009/0271844 A1    Oct. 29, 2009

(51) Int. Cl.
*G06F 15/16* (2006.01)
*H04L 29/06* (2006.01)
*G06F 17/30* (2006.01)

(52) U.S. Cl.
USPC ............... 726/4; 726/1; 713/164; 713/166

(58) Field of Classification Search
None
See application file for complete search history.

(56) References Cited

U.S. PATENT DOCUMENTS

| | | | | |
|---|---|---|---|---|
| 7,676,673 | B2 * | 3/2010 | Weller et al. | 713/164 |
| 7,707,620 | B2 * | 4/2010 | Cherepov | 726/1 |
| 2005/0071677 | A1 * | 3/2005 | Khanna et al. | 713/201 |
| 2005/0091502 | A1 * | 4/2005 | Cargille et al. | 713/182 |
| 2005/0097355 | A1 * | 5/2005 | England et al. | 713/200 |
| 2005/0144477 | A1 * | 6/2005 | Ball et al. | 713/201 |
| 2005/0268095 | A1 * | 12/2005 | O'Connor | 713/167 |
| 2006/0090084 | A1 * | 4/2006 | Buer | 713/189 |
| 2006/0242685 | A1 * | 10/2006 | Heard et al. | 726/3 |
| 2006/0259487 | A1 * | 11/2006 | Havens et al. | 707/9 |

(Continued)

OTHER PUBLICATIONS

"BootVis"—Wikipedia, the free encyclopedia, http://en.wikipedia.org/wiki/Bootvis, 2 pages.

(Continued)

*Primary Examiner* — Nathan Flynn
*Assistant Examiner* — Trang Doan
(74) *Attorney, Agent, or Firm* — Kenneth L. Sherman, Esq.; Michael Zarrabian, Esq.; Sherman & Zarrabian LLP

(57) ABSTRACT

Improved techniques for controlling access to accessible components of computing environments are disclosed. The techniques, among other things, can be used to provide Mandatory Access Control (MAC) mechanisms for mobile and embedded systems. One or more accessible components (e.g., accessible resources) which a component may attempt to access are determined so that one or more access permissions can be stored in a manner that they can be obtained if the component attempts to access the one or more accessible components, thereby allowing access to the one or more accessible components to be determined based on access permissions that are readily available. Generally, access permissions can be identified and stored in anticipation of need. Access permissions can be identified, for example, based on the likelihood of use, or all possible access permissions can be determined and stored. A safe (e.g., a trusted) access controlling (or monitoring) system (or component) can control access to resources of a computing environment. For example, a trusted access monitoring system can be provided in a secure and trusted operating environment utilizing Mandatory Access Control (MAC) capabilities of a secure operating system (e.g., SELinux Operating System).

41 Claims, 10 Drawing Sheets

(56) References Cited

U.S. PATENT DOCUMENTS

| | | | |
|---|---|---|---|
| 2007/0180509 A1* | 8/2007 | Swartz et al. | 726/9 |
| 2008/0077971 A1* | 3/2008 | Wright et al. | 726/1 |
| 2008/0104665 A1* | 5/2008 | Naldurg et al. | 726/2 |
| 2008/0120510 A1* | 5/2008 | Challener et al. | 713/186 |
| 2008/0141338 A1* | 6/2008 | Kim et al. | 726/1 |
| 2008/0201778 A1* | 8/2008 | Guo et al. | 726/23 |
| 2009/0094676 A1* | 4/2009 | Burugula et al. | 726/2 |
| 2009/0126006 A1* | 5/2009 | Zhang et al. | 726/17 |

OTHER PUBLICATIONS

"Linux Security Modules"—Wikipedia, the free encyclopedia, http://en.wikipedia.org/wiki/Linux_security_Modules, 3 pages.

"Reference monitor"—Wikipedia, the free encyclopedia, http://en.wikipedia.org/wiki/Reference_monitor, 1 page.

\* cited by examiner

SAFE AND EFFICIENT ACCESS CONTROL MECHANISMS FOR COMPUTING ENVIRONMENTS

BACKGROUND OF THE INVENTION

Conceptually, a computing system (e.g., a computing device, a personal computer, a laptop, a Smartphone, a mobile phone) can accept information (content or data) and manipulate it to obtain or determine a result based on a sequence of instructions (or a computer program) that effectively describes how to process the information. Typically, the information used by a computing system is stored in a computer readable memory using a digital or binary form. More complex computing systems can store content including the computer program itself. A computer program may be invariable and/or built into, for example, a computer (or computing) device as logic circuitry provided on microprocessors or computer chips. Today, general purpose computers can have both kinds of programming. A computing system can also have a support system which, among other things, manages various resources (e.g., memory, peripheral devices) and services (e.g., basic functions such as opening files) and allows the resources to be shared among multiple programs. One such support system is generally known as an Operating System (OS) which provides programmers with an interface used to access these resources and services.

Today, numerous types of computing devices are available. These computing devices widely range with respect to size, cost, amount of storage and processing power. The computing devices that are available today include: powerful and generally expensive servers, relatively cheaper Personal Computers (PC's) and laptops, and yet less expensive microprocessors (or computer chips) provided in storage devices, automobiles, household electronic appliances, etc.

In recent years, computing systems have become more portable and mobile. As a result, various mobile and handheld devices have been made available. By way of example, wireless phones, media players, Personal Digital Assistants (PDA's) are widely used today. Generally, a mobile or a handheld device (also known as handheld computer or simply handheld) can be a pocket-sized computing device, typically utilizing a small visual display screen for user output and a miniaturized keyboard for user input. In the case of a Personal Digital Assistant (PDA), the input and output can be combined into a touch-screen interface.

In particular, mobile communication devices (e.g., mobile phones) have become extremely popular. Some mobile communication devices (e.g., Smartphones) offer computing environments that are similar to that provided by a Personal Computer (PC). As such, a Smartphone can effectively provide a complete operating system as a standardized interface and platform for application developers. Given the popularity of mobile communication devices, telecommunication is discussed in greater detail below.

Generally, telecommunication refers to assisted transmission of signals over a distance for the purpose of communication. In earlier times, this may have involved the use of smoke signals, drums, semaphore or heliograph. In modern times, telecommunication typically involves the use of electronic transmitters such as telephone, television, radio or computer. Early inventors in the field of telecommunication include Alexander Graham Bell, Guglielmo Marconi and John Logie Baird. Telecommunication is an important part of the world economy and the telecommunication industry's revenue is placed at just under 3 percent of the gross world product.

Conventional telephones have been in use for many years. The first telephones had no network but were in private use, wired together in pairs. Users who wanted to talk to different people had as many telephones as necessary for the purpose. Typically, a person who wished to speak, whistled into the transmitter until the other party heard. Shortly thereafter, a bell was added for signaling, and then a switch hook, and telephones took advantage of the exchange principle already employed in telegraph networks. Each telephone was wired to a local telephone exchange, and the exchanges were wired together with trunks. Networks were connected together in a hierarchical manner until they spanned cities, countries, continents and oceans. This can be considered the beginning of the public switched telephone network (PSTN) though the term was unknown for many decades.

Public switched telephone network (PSTN) is the network of the world's public circuit-switched telephone networks, in much the same way that the Internet is the network of the world's public IP-based packet-switched networks. Originally a network of fixed-line analog telephone systems, the PSTN is now almost entirely digital, and now includes mobile as well as fixed telephones. The PSTN is largely governed by technical standards created by the ITU-T, and uses E.163/E.164 addresses (known more commonly as telephone numbers) for addressing.

More recently, wireless networks have been developed. While the term wireless network may technically be used to refer to any type of network that is wireless, the term is often commonly used to refer to a telecommunications network whose interconnections between nodes is implemented without the use of wires, such as a computer network (which is a type of communications network). Wireless telecommunications networks can, for example, be implemented with some type of remote information transmission system that uses electromagnetic waves, such as radio waves, for the carrier and this implementation usually takes place at the physical level or "layer" of the network (e.g., the Physical Layer of the OSI Model). One type of wireless network is a WLAN or Wireless Local Area Network. Similar to other wireless devices, it uses radio instead of wires to transmit data back and forth between computers on the same network. Wi-Fi is a commonly used wireless network in computer systems which enable connection to the internet or other machines that have Wi-Fi functionalities. Wi-Fi networks broadcast radio waves that can be picked up by Wi-Fi receivers that are attached to different computers or mobile phones. Fixed wireless data is a type of wireless data network that can be used to connect two or more buildings together in order to extend or share the network bandwidth without physically wiring the buildings together. Wireless MAN is another type of wireless network that connects several Wireless LANs.

Today, several mobile networks are in use. One example is the Global System for Mobile Communications (GSM) which is divided into three major systems which are the switching system, the base station system, and the operation and support system (Global System for Mobile Communication (GSM)). A cell phone can connect to the base system station which then connects to the operation and support station; it can then connect to the switching station where the call is transferred to where it needs to go (Global System for Mobile Communication (GSM)). This is used for cellular phones and common standard for a majority of cellular providers. Personal Communications Service (PCS): PCS is a radio band that can be used by mobile phones in North America. Sprint happened to be the first service to set up a PCS. Digital Advanced Mobile Phone Service (D-AMPS) is an upgraded version of AMPS but it may be phased out as the newer GSM networks are replacing the older system.

Yet another example is the General Packet Radio Service (GPRS) which is a Mobile Data Service available to users of Global System for Mobile Communications (GSM) and IS-136 mobile phones. GPRS data transfer is typically charged per kilobyte of transferred data, while data communication via traditional circuit switching is billed per minute of connection time, independent of whether the user has actually transferred data or has been in an idle state. GPRS can be used for services such as Wireless Application Protocol (WAP) access, Short Message Service (SMS), Multimedia Messaging Service (MMS), and for Internet communication services such as email and World Wide Web access. 2G cellular systems combined with GPRS is often described as "2.5G", that is, a technology between the second (2G) and third (3G) generations of mobile telephony. It provides moderate speed data transfer, by using unused Time Division Multiple Access (TDMA) channels in, for example, the GSM system. Originally there was some thought to extend GPRS to cover other standards, but instead those networks are being converted to use the GSM standard, so that GSM is the only kind of network where GPRS is in use. GPRS is integrated into GSM Release 97 and newer releases. It was originally standardized by European Telecommunications Standards Institute (ETSI), but now by the 3rd Generation Partnership Project (3GPP). W-CDMA (Wideband Code Division Multiple Access) is a type of 3G cellular network. W-CDMA is the higher speed transmission protocol used in the Japanese FOMA system and in the UMTS system, a third generation follow-on to the 2G GSM networks deployed worldwide. More technically, W-CDMA is a wideband spread-spectrum mobile air interface that utilizes the direct sequence Code Division Multiple Access signaling method (or CDMA) to achieve higher speeds and support more users compared to the implementation of time division multiplexing (TDMA) used by 2G GSM networks.

Generally, a mobile phone or cell phone can be a long-range, portable electronic device used for mobile communication. In addition to the standard voice function of a telephone, current mobile phones can support many additional services such as SMS for text messaging, email, packet switching for access to the Internet, and MMS for sending and receiving photos and video. Most current mobile phones connect to a cellular network of base stations (cell sites), which is in turn interconnected to the public switched telephone network (PSTN) (one exception is satellite phones).

The Short Message Service (SMS), often called text messaging, is a means of sending short messages to and from mobile phones. SMS was originally defined as part of the GSM series of standards in 1985 as a means of sending messages of up to 160 characters, to and from Global System for Mobile communications (GSM) mobile handsets. Since then, support for the service has expanded to include alternative mobile standards such as ANSI CDMA networks and Digital AMPS, satellite and landline networks. Most SMS messages are mobile-to-mobile text messages, though the standard supports other types of broadcast messaging as well. The term SMS is frequently used in a non-technical sense to refer to the text messages themselves, particularly in non-English-speaking European countries where the GSM system is well-established.

Multimedia Messaging Service (MMS) is a relatively more modern standard for telephony messaging systems that allows sending messages that include multimedia objects (images, audio, video, rich text) and not just text as in Short Message Service (SMS). It can be deployed in cellular networks along with other messaging systems like SMS, Mobile Instant Messaging and Mobile E-mal. Its main standardization effort is done by 3GPP, 3GPP2 and Ope Mobile Alliance (OMA).

The popularity of computing systems, especially mobile communication devices is evidenced by their ever increasing use in everyday life. Accordingly, techniques that can enhance computing systems and/or their use would be very useful.

SUMMARY OF THE INVENTION

Broadly speaking, the invention relates to computing systems. More particularly, the invention relates to techniques for controlling access to accessible components of computing environments. It will be appreciated that the techniques, among other things, can be used to provide Mandatory Access Control (MAC) mechanisms for mobile and embedded systems.

In accordance with one aspect of the invention, one or more accessible components (e.g., accessible resources) which a component may attempt to access are determined so that one or more access permissions can be stored in a manner that they can be obtained if the component attempts to access the one or more accessible components, thereby allowing access to the one or more accessible components to be determined based on access permissions that have already been determined. In accordance with one embodiment of the invention, an access monitoring system can be operable to: determine one or more accessible components that a component may attempt to access, obtain (e.g., determine) one or more access permissions that effectively indicate whether the component is allowed or not allowed to access the one or more accessible components, and store the access permission(s) in a manner allowing access to the accessible component(s) to be controlled based on the stored access permission(s). By way of example, access permissions for one or more accessible resources (or resources) that a first component (e.g., application program) may access can be determined (e.g., calculated based on various rules, policies and/or other criteria) and stored in memory before the first component becomes fully operational to actually attempt to access the one or more resources. It will be appreciated that having access permissions readily available can save processing time and would allow providing mandatory access control mechanisms for mobile and embedded devices, as well as providing more sophisticated access control mechanisms for more conventional environments such as desktop and server-based computing environments.

In accordance with another aspect of the invention, access permissions can be identified and stored in anticipation of their need. Access permissions can be identified, for example, based on the likelihood of need (e.g., likelihood that they may be needed). As such, factors including the likelihood of a component accessing one or more accessible components, and the likelihood that one or more accessible components may be accessed, can be considered to effectively make better decisions about which access permissions should be stored in anticipation of being needed. This likelihood can, for example, be determined based on observed behavior (e.g., logged or historical data) and/or predicted behavior (e.g., generalized profiles) with respect to, for example, an executable component (e.g., an application), a user (e.g., a person, an end-user application), and context of use (e.g., physical location, time).

In accordance with yet another aspect of the invention, all possible access permissions can be determined and stored so that they can be readily available and used as needed in order to determine whether to allow or deny a component access to an accessible component. It will be appreciated that determining all possible access permissions is especially useful for mobile and embedded systems. Furthermore, this approach can be made even more feasible if access permission types are categorized in accordance with entities that are most prevalent in a computing environment (e.g., access types can be defined based on entities that are prevalent in mobile computing environments including manufacturers, network providers, service providers, and users).

Other aspects of the invention can effectively provide a safe (e.g., a trusted) access controlling (or monitoring) system (or component) to control access to resources of a computing environment. For example, a trusted access monitoring system can be provided in a secure and trusted operating environment which utilizes Mandatory Access Control (MAC) capabilities of a secure operating system (e.g., SELinux Operating System) in accordance with one embodiment of the invention. As a trusted component, the access monitoring system can perform and/or effectively manage various access controlling operations including, for example, determining access permissions based on trustworthiness (e.g., level of trust) of an executable component and/or resource. In addition, the trusted access monitoring system can be operable to effectively use various access profiles in order to make better decisions regarding which access permissions to store, if it is not feasible or desirable to store all possible access permissions. It will be appreciated that a trusted access monitoring system can be provided to work with a SELinux Operating System operating in a mobile computing device (e.g., a mobile phone, a Smartphone). Generally, it will be appreciated that one or more aspects of the invention including those described above can be combined.

The invention can be implemented in numerous ways, including, for example, a method, an apparatus, a computer readable medium, and a computing system (e.g., a computing device). Several embodiments of the invention are discussed below.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

Figure 1A:
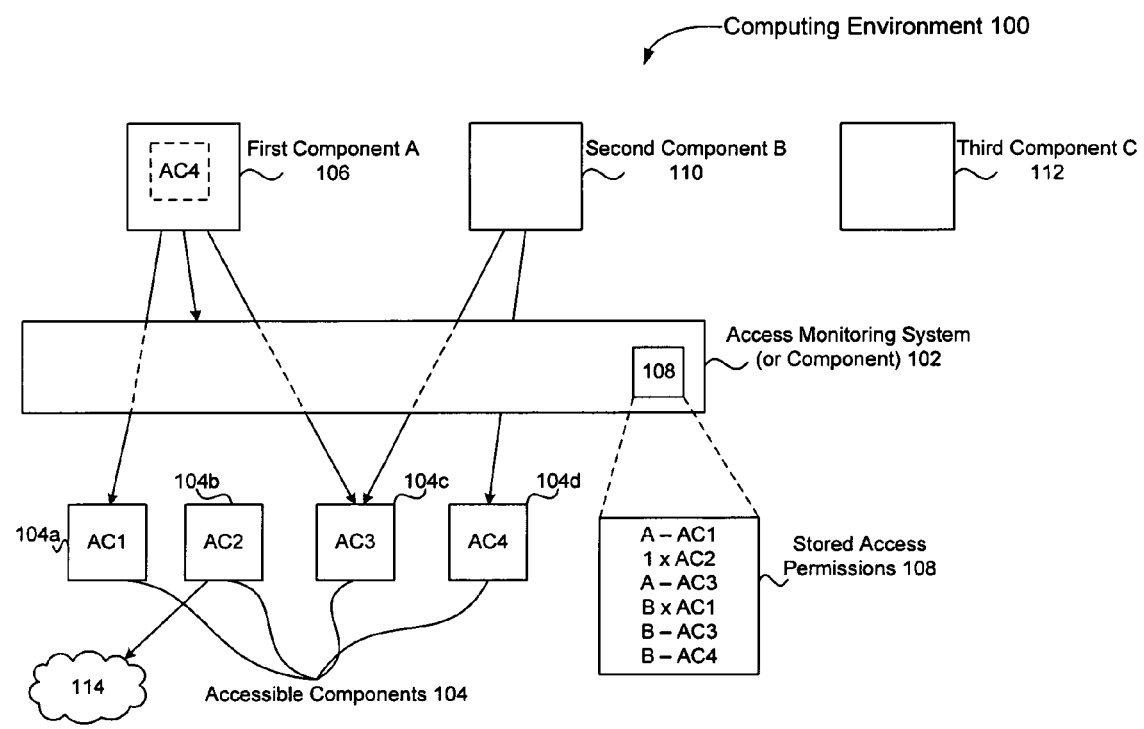
FIG. 1A depicts a computing environment in accordance with one embodiment of the invention.

As noted in the background section, computing devices and especially mobile devices are becoming increasingly more popular. Today, wireless networks and mobile communication devices (e.g., Smartphones, cell phones, Personal Digital Assistants) are especially popular. Unfortunately, however, partly because of this popularity, more and more malicious attacks are being directed to wireless networks and mobile communication devices. In addition, recent developments, including relatively new services (e.g., email, file transfer and messaging) and use of common software platforms (e.g., Symbian, Embedded Linux, and Windows CE operating systems) have made mobile communication devices relatively more exposed to malicious attacks. The exposure to malicious attacks could become worse as the wireless networks and mobile communication devices continue to evolve rapidly. Today, wireless and/or portable communication devices (e.g., cell phones, Smartphones) can offer similar functionality as that more traditionally offered by Personal Computers (PCs). As a result, wireless and/or portable communication devices are likely to face similar security problems (e.g., worms, viruses) as those encountered in more traditional computing environments.

Examples of the most notorious threats to cell phones include the Skull, Cabir, and Mabir worms which have targeted the Symbian operating systems. Generally, an MMS-based worm can start attacking initial targets (hit-list) from the network. Each infected phone can scan its contact list and randomly pick up members to deliver a malicious attack in the form of a message. A person can trust an incoming message due to its attractive title or seemingly familiar source and activate the attached file and unwittingly get a phone infected. The infected phone can in turn get other phones infected, and so on. In contrast, a Blue-tooth based worm can take control of a victim phone's Blue-tooth interface and continuously scan for other Blue-tooth-enabled phones within its range. Once a new target has been detected, the worm can effectively connect to other devices and transfer a malicious message to them, and so on.

Taking a cell phone as an example, an active cell phone typically has two security states: susceptible and infected. A susceptible cell phone is not completely protected against worms and may get infected when exposed to a specific worm (e.g., CommWarrior). An infected cell phone can return back to the susceptible state when the user launches a protection (e.g., the CommWarrior patch from F-Secure or Symantec) partly because the cell phone is susceptible to other worm threats. Malware has many other undesirable effects including compromising the privacy of the users.

In addition, numerous applications and services are available from different entities and can be deployed on mobile devices. In other words, various entities including device vendors, network providers, and software vendors can effectively provide computer code and support the operation of a mobile device. As a result, providing a safe and manageable mobile device requires addressing numerous new challenges not generally seen in more conventional computing systems (e.g., conventional Personal Computers). To further add to this difficulty, future generations of mobile devices could be required to provide even more capabilities, and yet be safer and more manageable than the device in existence today. These capabilities can, for example, include the requirements set forth by the Open Mobile Terminal Platform (OMTP) which is a forum created by mobile network operators to discuss standards with manufacturers of cell phones and other mobile devices. The requirements set forth by the Open Mobile Terminal Platform (OMTP) are available from the OMTP organization and are hereby incorporated by reference herein for all purposes.

Generally, controlling access in order to protect various components is a major concern of most computing environments including mobile computing environments. Accordingly, improved techniques for controlling access would be useful. In particular, controlling access to accessible components (e.g., resources) of a mobile computing environment poses additional challenges partly because of the limited processing operating power and/or memory typically available in comparison to more conventional computing environments (e.g., desktop or server-based computing environments). As such, techniques that may be feasible for desktop or server-based computing environments may not be feasible for mobile computing environments. By way of example, although Mandatory Access Control (MAC) mechanisms have been more recently developed in an attempt to provide more secure operating environments (e.g., MAC mechanism of Secure Linux—also known as "SELinux"), such capabilities have not been developed for mobile or embedded computing environments. In fact, conventional belief suggests that it is infeasible to provide Mandatory Access Control (MAC) for mobile or embedded system partly because of their relatively limited processing power and/or memory.

In view of the foregoing, improved techniques for controlling access in computing environments, especially mobile and/or embedded computing environments, would be useful.

Accordingly, the invention provides improved techniques for controlling access to accessible components of computing environments. It will be appreciated that the techniques, among other things, can be used to provide Mandatory Access Control (MAC) mechanisms for mobile and embedded systems.

In accordance with one aspect of the invention, one or more accessible components (e.g., accessible resources) which a component may attempt to access are determined so that one or more access permissions can be stored in a manner that they can be obtained if the component attempts to access the one or more accessible components, thereby allowing access to the one or more accessible components to be determined based on access permissions that have already been determined. In accordance with one embodiment of the invention, an access monitoring system can be operable to: determine one or more accessible components that a component may attempt to access, obtain (e.g., determine) one or more access permissions that effectively indicate whether the component is allowed or not allowed to access the one or more accessible components, and store the access permission(s) in a manner allowing access to the accessible component(s) to be controlled based on the stored access permission(s). By way of example, access permissions for one or more accessible resources (or resources) that a first component (e.g., application program) may access can be determined (e.g., calculated based on various rules, policies and/or other criteria) and stored in memory before the first component becomes fully operational to actually attempt to access the one or more resources. It will be appreciated that having access permissions readily available can save processing time and would allow providing mandatory access control mechanisms for mobile and embedded devices, as well as providing more sophisticated access control mechanisms for more conventional environments such as desktop and server-based computing environments.

In accordance with another aspect of the invention, access permissions can be identified and stored in anticipation of their need. Access permissions can be identified, for example, based on the likelihood of need (e.g., likelihood that they may be needed). As such, factors including the likelihood of a component accessing one or more accessible components, and the likelihood that one or more accessible components may be accessed, can be considered to effectively make better decisions about which access permissions should be stored in anticipation of being needed. This likelihood can, for example, be determined based on observed behavior (e.g., logged or historical data) and/or predicted behavior (e.g., generalized profiles) with respect to, for example, an executable component (e.g., an application), a user (e.g., a person, an end-user application), and context of use (e.g., physical location, time).

In accordance with yet another aspect of the invention, all possible access permissions can be determined and stored so that they can be readily available and used as needed in order to determine whether to allow or deny a component access to an accessible component. It will be appreciated that determining all possible access permissions is especially useful for mobile and embedded systems. Furthermore, this approach can be made even more feasible if access permission types are categorized in accordance with entities that are most prevalent in a computing environment (e.g., access types can be defined based on entities that are prevalent in mobile computing environments including manufacturers, network providers, service providers, and users).

Other aspects of the invention can effectively provide a safe (e.g., a trusted) access controlling (or monitoring) system (or component) to control access to resources of a computing environment. For example, a trusted access monitoring system can be provided in a secure and trusted operating environment which utilizes Mandatory Access Control (MAC) capabilities of a secure operating system (e.g., SELinux Operating System) in accordance with one embodiment of the invention. As a trusted component, the access monitoring system can perform and/or effectively manage various access controlling operations including, for example, determining access permissions based on trustworthiness (e.g., level of trust) of an executable component and/or resource. In addition, the trusted access monitoring system can be operable to effectively use various access profiles in order to make better decisions regarding which access permissions to store, if it is not feasible or desirable to store all possible access permissions. It will be appreciated that a trusted access monitoring system can be provided to work with a SELinux Operating System operating in a mobile computing device (e.g., a mobile phone, a Smartphone). Generally, it will be appreciated that one or more aspects of the invention including those described above can be combined.

Embodiments of these aspects of the invention are discussed below with reference to FIGS. 1A-5. However, those skilled in the art will readily appreciate that the detailed description given herein with respect to these figures is for explanatory purposes as the invention extends beyond these limited embodiments.

FIG. 1A depicts a computing environment 100 in accordance with one embodiment of the invention. The computing environment 100 can, for example, include and/or be provided for one or more computing systems and/or devices (e.g., a general purpose computer, mobile device, mobile phone). Referring to FIG. 1A, an access monitoring system (or component) 102 effectively controls access to accessible components 104 of the computing environment 100. In other words, the access monitoring system 102 can be operable to effectively allow or deny access to a component 106 when it attempts to access an accessible component 104. Typically, component 106 may attempt to access one or more of the accessible components 104 when it is operational (e.g., when the component 106 is being executed on a device as an executable component). Generally, the component 106 can be any component of the computing environment 100 which is operable to attempt to access and/or access an accessible component 104 of the computing environment 100. As such, the component 106 can, for example, be an application program, a process, a thread, a client application, a task, and a service. It will be appreciated that the component 106 can also be and/or represent a domain (and/or engine) provided in the context of a mobile computing environment, as will be described in greater detail below. It should also be noted that the component 106 can be and/or effectively represent a computing environment in itself which is in communication with and/or operating within the computing environment 100. Generally, an accessible component 104 can be any component which is accessible to at least one other component associated with the computing environment 100. As such, an accessible component 104 can, for example, be an accessible resource (or resource). Examples of a resource include: a shared resource, a file, a socket, an interfaces, a network connection, Inter-Process Communication (IPC) objects, message passing objects, synchronization objects, shared memory objects, and remote procedure calls (RPC) objects which are generally known in the art.

Those skilled in the art are also familiar with the general concept of a "reference monitoring" for effectively controlling access to various components of a computing environment. In the context of a "reference monitoring" a component known as a "subject" can attempt to access another component known as a "object." An "object" may be a "subject" in relation to another "object" because a component can generally be accessible by a second component and also capable of accessing a third component (or the second component). It would also be appreciated that the access monitoring system 102 can effectively provide reference monitoring capabilities. As such, an accessible component 104 can be considered as an "object" that may be accessed by the component 106 which can represent a "subject" in the context of "reference monitoring."

In any case, the access monitoring system 102 can effectively control access to the accessible components 104. More particularly, the access monitoring system 102 is operable to effectively determine that a component 106 may attempt (or is capable of attempting) to access one or more accessible components 104. By way of example, the access monitoring system 102 can determine that a first component 106 may attempt to access three (3) accessible components, namely, accessible components 104a, 104b and 104c. The access monitoring system 102 can also be operable to obtain access permissions for the particular accessible components 104 that the component 106 may access (104a, 104b and 104c). Generally, the access permissions can effectively indicate whether a component 106 is allowed or not allowed to access accessible components 104a, 104b and 104c.

Referring to FIG. 1A, access permissions 108 are obtained and stored by the access monitoring system 102 as stored access permissions 108. The stored access permissions 108 can, for example, indicate that the first component 106 is allowed to access first and third accessible components (104a and 104c) but not allowed to access a second accessible component (104b). In any case, the stored access permissions 108 can allow the access monitoring system 102 to readily determine whether access should be granted or denied to the component 106 if the component 106 attempts and/or requests to access any one of the accessible components 104a, 104b and 104c. This means that access permissions need not be determined when the components 106 attempts to access the accessible components 104a, 104b and 104c. Determining access permissions can require processing. This processing need not be performed when access is actually attempted if the access permissions are available and can be obtained.

Generally, the access monitoring system 102 can be operable to obtain access permissions. For example, the access monitoring system 102 can be operable to determine (e.g., calculate) the access permissions 108 and/or obtain them from another source (not shown). Moreover, the access monitoring system 102 can be operable to obtain and/or determine the access permissions 108 before an attempt to access has been made. By way of example, the access monitoring system 102 can be operable to determine which one of the accessible components 104 may be accessed by the component 106 before the component 106 is fully operational for accessing any of the accessible components 104. For example, when the component 106 is an executable component operating on a device, it can be determined which accessible components can be accessed by the component 106 before the component 106 is initiated, loaded, lunched and/or started on the device. The access monitoring system 102 can be operable on a device where the component 106 is executing and/or accessible components 104 are provided. However, generally, the access monitoring system 102 can be provided to effectively control access to various accessible components which may be accessed by one or more other components.

It will be appreciated that the access monitoring system 102 can be operable to determine all the accessible components (e.g., resources) 104 that the component 106 can attempt to access and/or determine all possible components (e.g., applications) that may be used generally or for more specific situation. As such, the access monitoring system 102 can also be operable to obtain and/or determine all the necessary access permissions for determining whether to allow or deny access to any component that may be present in the computing environment 100 with respect to accessing any of the accessible resources of the computing environment 100. It will be appreciated that it is feasible to determine all access possibilities and/or access permissions in mobile computing environments where the number of components and accessible resources are typically relatively less than that which is prevalent in more conventional environments (e.g., server-based computing environments where typically numerous process associated with several applications can attempt to access numerous accessible resources).

It should be noted that the access monitoring system 102 can be operable to effectively make decisions regarding which access permission should be determined and/or stored as stored access permissions 108. For example, rather than determining all possibilities of access permissions, the access monitoring system 102 can be operable to use one or more criteria in order to determine which accessible components 104 are likely to be accessed by the component 106. By way of example, the access monitoring system 102 can determine that the component 106 is likely to access the accessible components 104a, 104b and 104c, and subsequently proceed to obtain (e.g., determine, load) the access permissions that effectively indicate whether to grant or deny access to component 106 if and when it attempts to access any one of the accessible components 104a, 104b and 104c. The determination of which one or more of the accessible components 104 are likely to be accessed by the component 106 can, for example, be made by identifying one or more accessible components 104 that the component 106 has accessed and/or has attempted to access.

As another example, a profile can be obtained that effectively identifies one or more accessible components that are likely to be accessed by the component 106. A profile can, for example, be generated based on historical use of component 106 and/or use of accessible components 104 by a user (e.g., a person). As yet another example, contextual information (e.g., physical location, time of the day) which effectively represents a situation can be used to identify one or more accessible components 104 which are likely to be accessed by the component 106.

It will also be appreciated that the access monitoring system 102 can be further operable to define and/or update access profiles which can be used to effectively access the likelihood of use of accessible resources 104 by the component 106. More generally, the access monitoring system 102 can be operable to effectively identify one or more components (106, 110 and 112) and/or accessible components 104 that are likely to be used in the computing environment 100. By way of example, at a given time, the access monitoring system 102 can determine that components 106 and 110 are likely to be used but a component 112 is not likely to be used in the computing environment 100. In addition, the access monitoring 102 can determine that the component 106 is likely to access (or try to access) accessible components 104a, 104b and 104c, and so on.

Referring to FIG. 1A, it should be noted that accessible components 104 can serve many functions. For example, an accessible component 104b can represent a communication port allowing communication with an external entity 114 (e.g., a network, a server). An accessible component 104c can effectively allow the component 106 to communicate with the component 110, an accessible component 104d can represent a resource and/or subcomponent of the component 106, and so on.

Figure 1B:
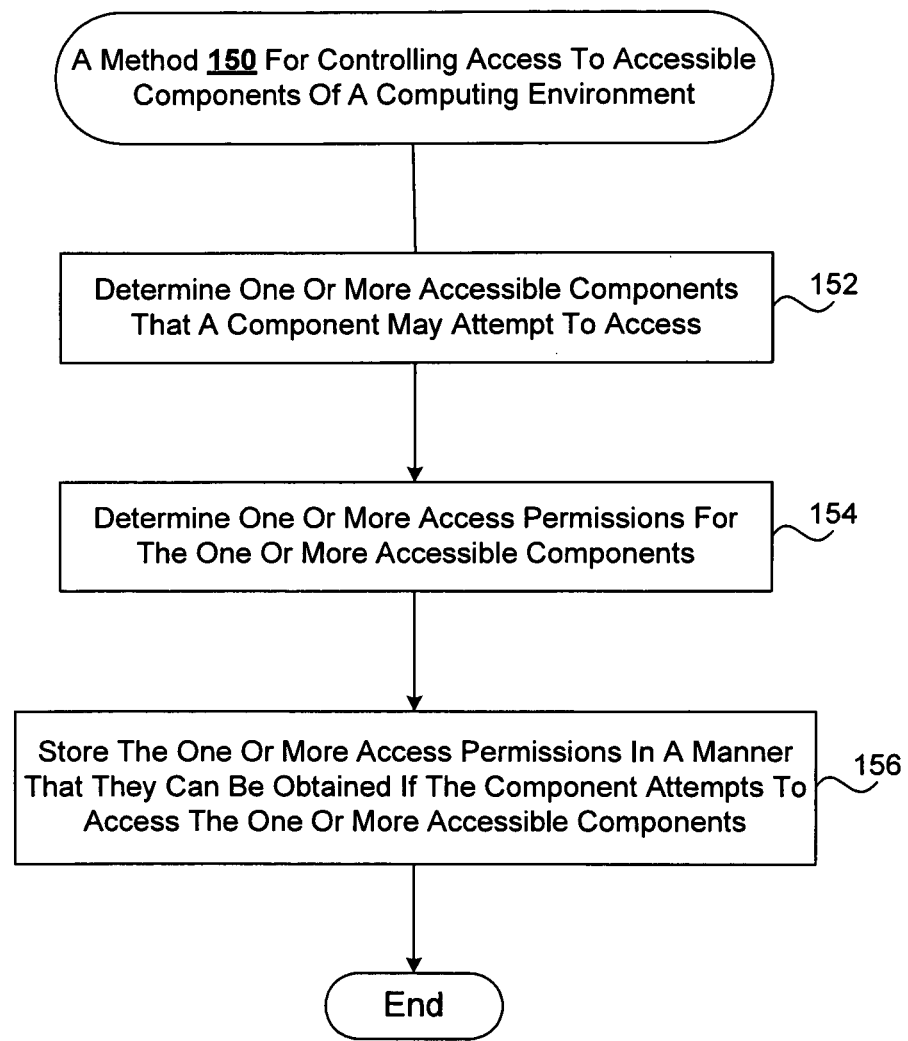
FIG. 1B depicts a method for controlling access to one or more accessible components of a computing environment in accordance with one embodiment of the invention.

FIG. 1B depicts a method 150 for controlling access to one or more accessible components of a computing environment in accordance with one embodiment of the invention. Method 150 can, for example, be performed by the access monitoring system 102 in order to control access to the accessible components 104 of the computing environment 100 (shown in FIG. 1A). Referring to FIG. 1B, one or more accessible components that a component may attempt to access are determined (152). Next, one or more access permissions for the one or more accessible components are determined (154). It should be noted that the one or more access permissions effectively indicate whether the component is allowed or not allowed to access the one or more accessible components. As such, the one or more access permissions can be effectively used to determine whether to grant or deny the component access to the one or more accessible components. After the one or more access permissions are determined (154), the one or more access permissions are stored (156) in a manner that they can be obtained if the component attempts to access the one or more accessible components, thereby allowing access to the one or more accessible components to be controlled based on the stored access permissions which are readily available if the component attempts to access the one or more accessible components.

Figure 1C:
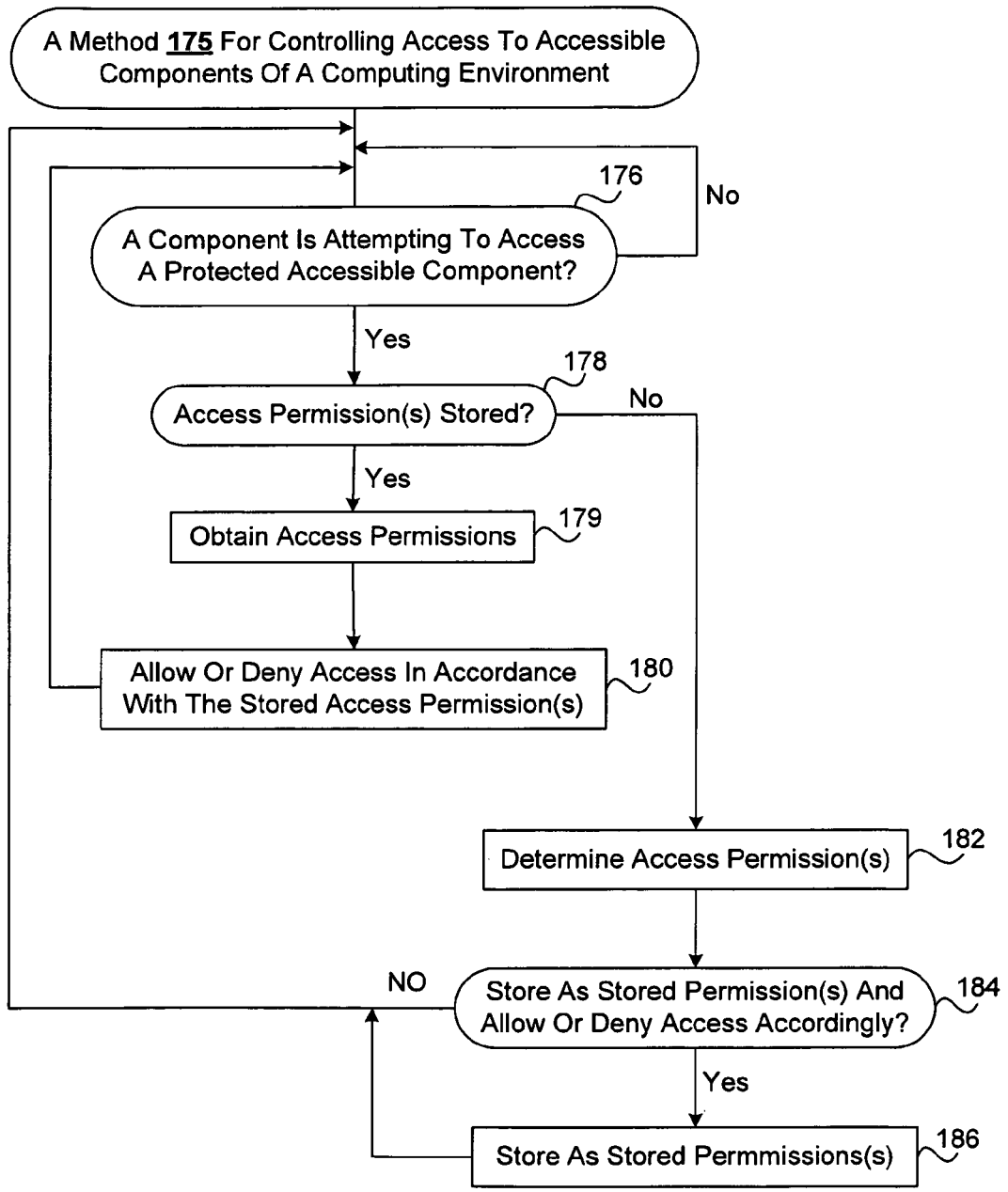
FIG. 1C depicts a method for controlling access to one or more accessible components of a computing environment in accordance with one embodiment of the invention.

FIG. 1C depicts a method 175 for controlling access to one or more accessible components of a computing environment in accordance with one embodiment of the invention. Method 175 can, for example, be used by the access monitoring 102 to control access to the accessible components 104 in the computing environment 100 (shown in FIG. 1A). Referring to FIG. 1C, initially, it is determined (176) whether a component is attempting to access a protected accessible component. In effect, the method 175 can wait for a component of the computing environment to attempt to access a protected accessible component. If it is determined (176) that a component is attempting to access a protected accessible component, it is determined (178) whether one or more accessible permissions which can be used to control access are stored. In other words, it can be determined (178) whether one or more access permissions which can effectively indicate whether to allow or deny the component access to the one or more accessible components have been stored and as such, readily available. As such, if it is determined (178) that the one or more accessible permissions pertaining to the component and the protected accessible components have been stored, the access permission(s) can be obtained (179) and access can be allowed or denied (180) in accordance with the stored access permission(s). Thereafter, the method 175 can proceed to determine (176) whether a component is attempting to access a protected accessible component in a similar manner as described above. On the other hand, if it is determined (178) that the one or more access permissions have not been stored, the one or more access permissions are determined (182) and access can be allowed or denied accordingly. Thereafter, it can be determined (184) whether to store the access permissions and the access permissions can be stored accordingly (186) before the method 175 proceeds to determine (176) whether a component is attempting to access a protected accessible component. Those skilled in the art will readily appreciate that the determination of whether to store the determined access permissions (184) can represent a design choice, an option and/or can be made based on various criteria (e.g., availability of memory).

As noted above, the access monitoring system 102 (shown in FIG. 1A) can be effectively provided for a device in order to control access to the accessible components (e.g., resources) of that device. It will also be appreciated that the access monitoring system 102 can be provided as a safe component (e.g., a trusted component). As such, the access monitoring system 102 can be provided as a safe access monitoring system to control access to the resources of a device.

Figure 2A:
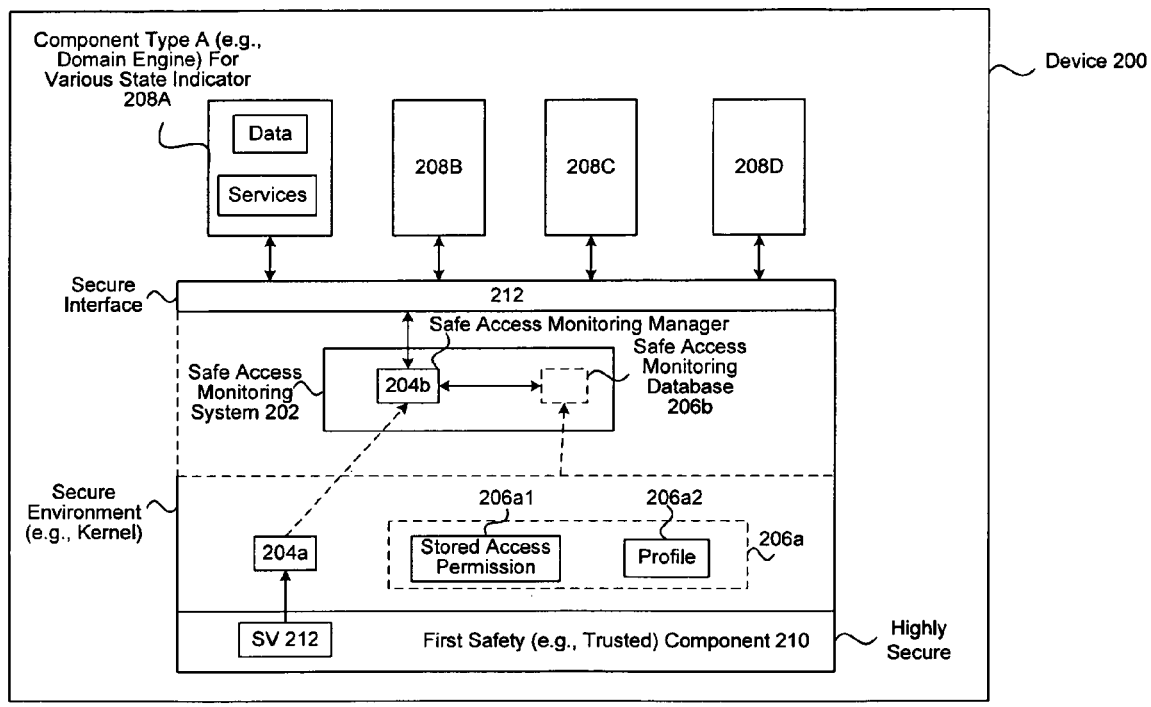
FIG. 2A depicts a device in accordance with one embodiment of the invention.

To further elaborate, FIG. 2A depicts a device 200 in accordance with one embodiment of the invention. Referring to FIG. 2A, the safe access monitoring system 202 is effectively provided for controlling access to accessible components (not shown) of the device 200. Generally, the safety of computer program code for an access monitoring component 204a can be verified before allowing it to be initiated on the device 200 as the safe access monitoring component 202b. By way of example, the integrity of the computer program code 204a can be verified before allowing it to be initiated as a trusted access monitoring management component 204b. Similarly, the safety of various other components of the safe access monitoring system 202 can be verified before allowing them to be initiated as a safe component (e.g., a trusted component). Referring to FIG. 2A, the safety of various other components including stored access permission (or rights) 206a1 and access profiles 206a2 can also be verified before allowing them to be initiated as the safe monitoring database 206b. It will be appreciated that the access profiles 206a2 can, for example, be provided as a database component to store various profiles including, for example, application-based, user-based, and context-based profiles. For example, an application-based include one or more profiles for one or more application programs and provide information with respect to the resources that have been accessed and/or likely to be accessed by the one or more application programs. An application-based profile can, for example, be provided for one or more application programs that have been and/or are likely to be executed on the device 200. Generally, the safe monitoring database 206b can store data pertaining and/or relating to access permissions and can be used by the safe access monitoring management component 204b to readily determine whether to grant or deny components 208 access to one or more of the accessible resources of the device 200. The safe monitoring database 206b can also be used to determine the access permissions.

It will be appreciated that the safety of the access monitoring component 204b and/or access monitoring database 206b can be verified by a first safety component 210 based on safety values (SV) 212. The first safety component 210 can operate in a highly secure area of the device 200. Also, the safety values (SV) 212 can be safely secured in a highly secure area (e.g., secured in hardware). By way of example, the first safety component 210 can be a Trusted Platform Module (TPM) operating in the hardware of the device 200 and securely stores the safety values (SC) 212 as integrity values for the computer program code 204, 206 and/or other components which can effectively serve as a second trusted component (e.g., a boot loader) and verify the safety of the access monitoring system 202 and/or yet other components.

It should be noted that the safe access monitoring system 202 can be operable to determine access permissions for various components 208 based on their safety or assessed safety. A component 208 can be generally known as "safe component" or as a component not known or believed to be safe ("unsafe component"). It is also possible to effectively assign various safety levels or scales to components 208. Similarly, the accessible resources of the device 200 may be assigned various safety levels and/or a general or specific level of safety. The safe access monitoring system 202 can also be operable to effectively verify the safety of various accessible resources before allowing them to be accessed especially by another safe component.

In any case, the safe access monitoring system 202 can be operable to effectively determine access permissions of the components 208, including their subcomponents, based on their safety and/or safety requirements. In other words, whether a particular component 208 (or its subcomponents) can access an accessible component can be determined based on the general and/or specific safety (or safety requirements) of the component 208 and/or the accessible resource.

As noted above, an access monitoring system can be operable to identify one or more executable components that may be executed on a device and/or one or more accessible resources that one or more executable components may try to access. As such, it will be appreciated that the safe access monitoring system 202 can be operable to determine which one or more components 208 are likely to be used on the device 200 and/or determine which one or more accessible resources the one or more components may try to access.

Furthermore, it will be appreciated that access permissions can be determined based on a type or category associated with the components 206 ("access type"). In a mobile computing environment, components 208 can present a domain or an engine associated with an entity (e.g., a stakeholder). These entities that are more prevalent in a mobile computing environment include: device manufacturers, network providers, service providers, and users (or end-users). It will be appreciated that the safe access monitoring system 202 can determine access permissions for the domains and/or engines for such entities, and store the access permissions so that they may be readily available. In addition, access permissions and profiles can be organized for the domains and/or engines prevalent in a mobile computing environment. Generally, access permissions can be determined for a mobile environment based on a number of access types significantly less than the number prevalent in the desktop computing environments. As such, the safe access monitoring system 202 is especially useful for mobile computing environments where, for example, the device 200 is provided as a mobile device (e.g., a mobile phone).

It will also be appreciated that the components 208 can be effectively isolated from each, for example, in accordance with the techniques described in U.S. patent application Ser. No. 11/963,363 which is hereby incorporated by reference herein in its entirety and for all purposes. Referring to FIG. 2A, a secure interface 212 can be effectively provided to allow safe interaction between the safe access monitoring system 202 and then components 208. The secure interface 212 can effectively be provided by a secure operating system (e.g., SELinux Operating System), as described in greater detail below.

Figure 2B:
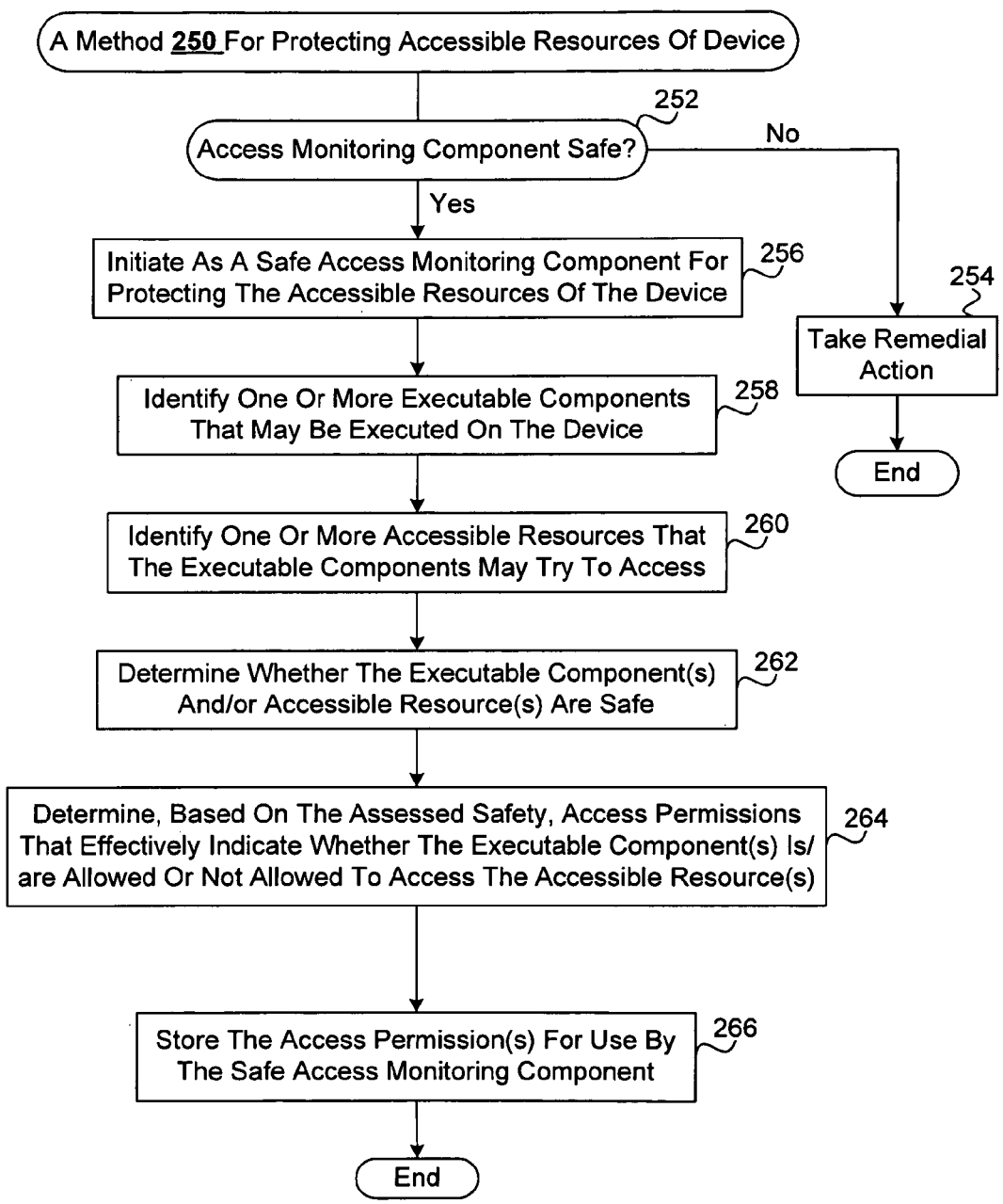
FIG. 2B depicts a method for protecting accessible resources of a device in accordance with one embodiment of the invention.

FIG. 2B depicts a method 250 for protecting accessible resources of a device in accordance with one embodiment of the invention. Method 250 can, for example, be performed by the device 200 depicted in FIG. 2A. Referring to FIG. 2B, initially, it is determined (252) whether an access monitoring component is safe. By way of example, the integrity of computing code for an access monitoring component can be verified before allowing the access monitoring component to be initiated as a safe component (e.g., a trusted component for the device). As such, if it is determined (252) that the access monitoring component is not safe, remedial actions can be taken (254) and the method 250 can end. By way of example, the device can be shut down or locked and/or an error message may be generated as remedial action.

On the other hand, if it is determined (252) that the access monitoring component is safe, the access monitoring component is initiated as a safe access monitoring component for the device. It should be noted that the determining (252) whether the access monitoring component is safe can be performed before allowing the accessible resources of the device to be accessed. Generally, the safe access monitoring component can be operable to protect the accessible resources of the device as a safe component (e.g., a trusted component). After the safe access monitoring component is initiated (256), one or more executable components that may be executed on the device are identified (258). Next, one or more accessible resources that the executable components may try to access are identified (260). Thereafter, it is determined (262) whether the one or more executable components and/or the one or more accessible resources are safe (262). In other words, the safety of one or more executable components and/or accessible resources can be effectively assessed (262). Assessing safety can be based on general safety or specific safety levels. By way of example, it can be determined (262) whether an executable component and/or the accessible component it may access are safe or whether a particular safety level is met (e.g., safety level 1, safety level 2, safety level 3, and so on). More generally, the safety (e.g., trustworthiness)

of an executable component and/or accessible resource can be effectively assessed (262). Accordingly, one or more access permissions can be determined (264) based on the assessed safety (e.g., trustworthiness) of the one or more executable components and/or accessible resources. It should be noted that the one or more access permissions can effectively indicate whether the one or more executable components should be allowed or denied access to the one or more accessible resources (264). The one or more access permissions are stored (266) for use by the safe access monitoring components in order to effectively protect the accessible resources. It should be noted that the one or more access permissions can be stored in a secured manner such that, for example, they can only be accessed by the safe access monitoring component or with its permission. The method 250 ends after the one or more access permissions are stored (266).

Figure 3A:
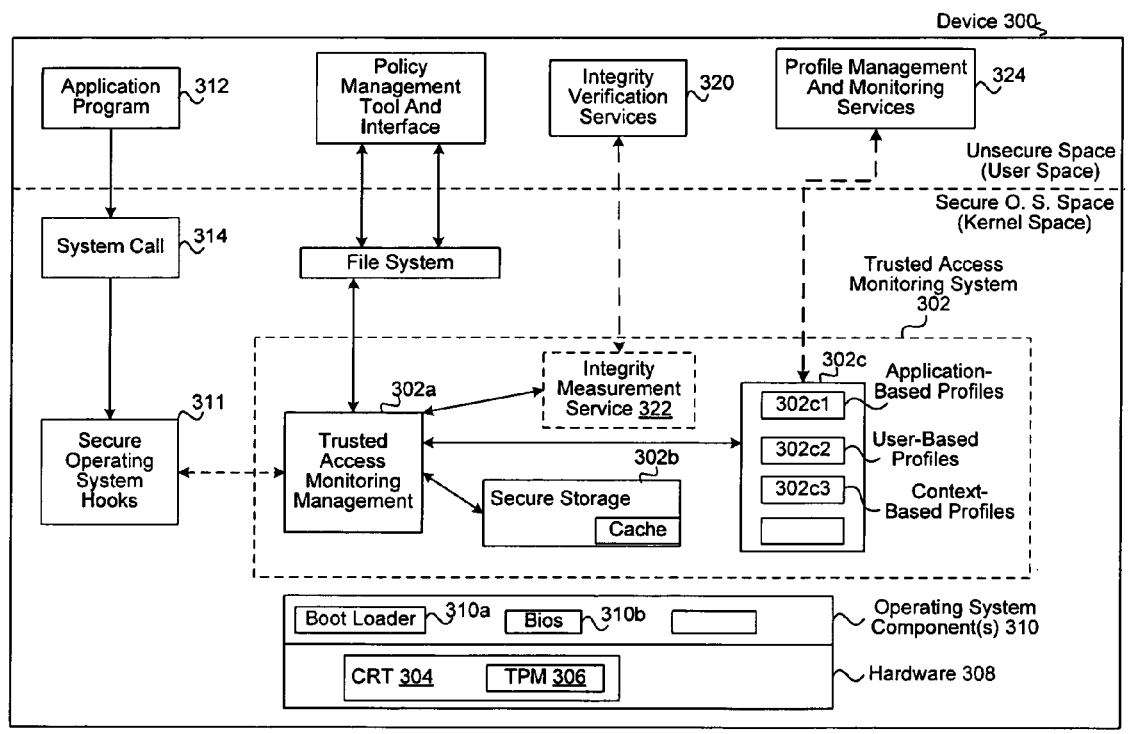
FIG. 3A depicts a device in accordance with another embodiment of the invention.

As noted above, a safety access monitoring system can, for example, be provided as a trusted component. To further elaborate, FIG. 3A depicts a device 300 in accordance with another embodiment of the invention. It will be appreciated that the device 300 can effectively provide a trusted access monitoring system 302 for controlling access to the accessible resources of the device 300. Referring to FIG. 3A, a Core Root of Trust (CRT) 304 includes a Trusted Platform Module (TPM) 306 provided as hardware for a hardware layer 308 of the device 300. Those skilled in the art will appreciate that the Trusted Platform Module (TPM) 306 can effectively verify the integrity of one or more operating system components 310, including a boot loader 310a, a Basic Input/Output System (BIOS) before allowing them to be initiated on the device 300. As a part of the Core Root of Trust (CRT) 304, the Trusted Platform Module (TPM) 306 can be initiated before the operating system for the device 300 is initiated or effectively started on the device 300 The TPM 306 can verify the integrity of the operating system components 310 before allowing them to be initiated on the device 300.

The Trusted Platform Module (TPM) 306 and/or one or more of the operating system components 310 can in turn verify the integrity of the trusted access monitoring system 302. In particular, the integrity of computer program code for one or more components of the trusted access monitoring system 302, namely, a trusted access monitoring manager 302a, a secure storage 302b and/or profile database 302c can be verified. By way of example, after the Trusted Platform Module (TPM) 306 successfully verifies the integrity of the boot loader 310, the boot loader 310 can verify the integrity of the computer program code for that trusted access monitoring manager 302a, a secure storage 302b and/or profile database 302c before allowing them to be initiated on the device 300.

Referring to FIG. 3A, a trusted access monitoring system 302 can be provided in a secure operating system space (e.g., kernel space). It will be also appreciated that the operating system can be a secure operating system. As such, the trusted access monitoring system 302 can effectively interface with a secure operating system (e.g., a SELinux Operating System) in accordance with the invention. Referring back to FIG. 3A, those skilled in the art will appreciate that operating system "hooks" 311 of the operating system which are generally secured in the secure space can effectively detect that an application program 312 executing on the device 300 is attempting to access an accessible resource by calling a system call 314. In particular, in case of secure operating system that provides Mandatory Access Control (MAC), such as, for example, SELinux Operating System, the secure operating system hooks 311 can be provided as a MAC mechanism for the device 300. In other words, an access checking functionality provided by a secure operating system can be used to detect an attempt to access resource when a system call 314 is made. Those skilled in the art would appreciate that the secure operating system "hooks" 311 can, for example, be provided as relatively simple computer program code that modifies standard system calls and/or somehow interfaces with them. As another example, when a SELinux Operating System is used, the operating system "hooks" 311 can be provided as Linux Security Modules (LSM) inside the kernel in order to use the Mandatory Access Control (MAC) mechanism provided by the SELinux Operating System. As generally known in the art, Linux Security Modules (LSM) can provide a framework that allows the Linux kernel to support a variety of computer security models while avoiding favoritism or reliance on any specific security implementation.

In any case, the secure operating system "hooks" 311 can effectively communicate with the trusted access monitoring manager 302A. More particularly, the secure operating system "hooks" 311 can effectively request that the trusted monitoring manager 302a determine whether access to an accessible resource should be granted or denied when the secure operating system "hooks" 311 detect that an application program 312 is attempting to access an accessible resource. By way of example, the application program 312 can make (or effectively invoke) a system call (e.g., open or socket system call for opening: a file, directory, device or a communication mechanism) in order to perform an access operation (e.g., read, write, execute, communicate). As a result of the system call, a secure operating system hook 311 associated with the system call can be effectively invoked. Moreover, the invoked secure operating system hook 311 can effectively solicit the trusted access monitoring manager 302a for an indication of whether to grant or deny the system call (i.e., grant or deny access to a resource which the system call is attempting to access).

Generally, the trusted access monitoring manager 302a can be operable to determine whether access to an accessible resource should be granted or denied based on one or more access permissions stored in a secure storage 302b, thereby allowing access to a system call to be granted or denied based on data which has been already determined and readily available from the secure storage 302b. As shown in FIG. 3A, a trusted access monitoring manager 302a can also access a profile database 302c. It will be appreciated that the profile database 302c can store various profiles including application-based (302c1), user-based (302c2), and context-based profiles (302c3). The application-based (302c1) can, for example, include one or more profiles for one or more application programs, and as such, can, for example, provide information with respect to the resources that have been accessed and/or likely to be accessed by the one or more application programs. The one or more application-based profiles (302c1) can, for example, be provided for one or more application programs that have been and/or are likely to be executed on the device 300.

Similarly, the user-based profiles 302c2 can, for example, include one or more user profiles for one or more users of the device 300, and as such, provide information with respect to resources that have been or are likely to be accessed by the one or more users of the device 300. The one or more context-based profiles 302c3 can, for example, provide information with respect to the resources that have been or are likely to be accessed in various situations. As such, a context-based profile can, for example, be provided as a "home profile" for situations where the device 300 operates in a "home" environment (e.g., when the device is being operated at home) as opposed to an "office" environment (e.g., where a device is operated at work), and so on. The "home profile" can generally identify one or more applications and/or resources that have been accessed or are likely to be accessed differently when the device is operating in the home environment. Various other context-based profiles 302c3 can be provided for other situations in a similar manner.

It will be appreciated that the profiles stored in the database 302c can be used in various ways to yield many benefits. For example, these profiles can be used to determine which access permissions are likely to be needed so they can be loaded into the secure storage 302b. As such, it is possible to, for example, use an application profile 302c in order to load access permissions for the application program 312 when the application 312 is loaded for execution on the device 300.

As shown in FIG. 3A, profile management and monitoring services 324 can be effectively provided by the device 300 in order to manage and/or monitor the database 302c. It should be noted that it is possible to update the profiles stored in the database 302c. Moreover, a profile can be updated based on historical data representative of behavior associated with, for example, one or more users and/or applications in order to make even better decisions with respect to identifying access permissions (e.g., identifying access permissions that are most likely to be needed by a user or an application. By way of example, a user profile (or user-based profile) 302c2 can be updated as more information is learned with respect to the user's behavior and/or changed as a result of observing changes in the behavior of the user.

It should also be noted that the access permissions can be determined and stored in profiles in the database 303c. By way of example, access permissions for various applications, domains and/or engines can be effectively predetermined (e.g., pre-calculated) by an external source and provided to the device 300. In the mobile computing environments, an entity (e.g., a service provider) can, for example, define and provide access permissions to its various components including its data and services. As such, a profile for an entity may be loaded into the secure storage 302b as needed.

Generally, operations associated with determining access permissions including loading, processing and updating profiles stored in the profile database 302c, as well as processing needed to determine access permissions, can be performed when desired, for example when power and processing time is available (e.g., at idle times and/or when the processing demands of the device 300 are below a threshold).

As noted above, determination of an access right may also include verifying the integrity of various executable components (e.g., the application program 312) and/or resources of the device 300. Referring to FIG. 3A, integrity measurement service 322 may also be provided by the trusted access monitoring system 302. Generally, integrity verification services 320 can be provided by the device 300. The integrity verification services 320 may be in communication with an external entity (e.g. a trusted verification server) (not shown). The trusted access monitoring manager 302a may be operable to communicate with the integrity verification services directly and/or via the integrity measurement service 322.

It is relatively easier to calculate all the possible access permissions for some computing environments (e.g., mobile and embedded computing environments) as the possibilities are relatively limited in comparison to other computing environments (e.g., server-based computing environments). As such, it is more feasible to calculate all possible access permissions for the device 300 when relatively fewer processes can concurrently run on the device 300. In case of a mobile device (e.g., a mobile and/or smart phone) typically fifteen to twenty (15-20) processes may run concurrently, including various operating system modules, services, and daemons, as will be known to those skilled in the art. The number of possibilities can be further reduced if a mobile computing environment uses a reference monitoring architecture that recognizes or is defined based on the entities typically encountered in a mobile computing environment. Those entities can be effectively represented by corresponding domains (or engines) including a manufacturer, network provider, service provider, and a user domain (or engine). In other words, the number of access types can be reduced by defining them based on the domains (or engines) representation of entities generally encountered in a mobile computing environment. As a result, number of possible access permissions can be significantly reduced making it more feasible for the trusted access monitoring manager 302a to effectively determine all the possible access permissions that the device 300 may encounter.

The trusted access monitoring manager 302a may also be operable to access a system log (not shown) in order to make decisions regarding which access permissions to be determined and/or stored in the secure storage 302b which can effectively serve as a cache and/or include a cache portion for allowing even faster access to access permissions. It will be appreciated that the trusted access monitoring manager 302a can effectively serve as a security server to provide access monitoring (or reference monitoring) services for the device 300. Generally, the trusted access monitoring manager 302a can serve as a reference monitor and/or provide reference monitoring capabilities. A reference monitoring architecture compatible with the access monitoring manager 302a is described below.

Figure 3B:
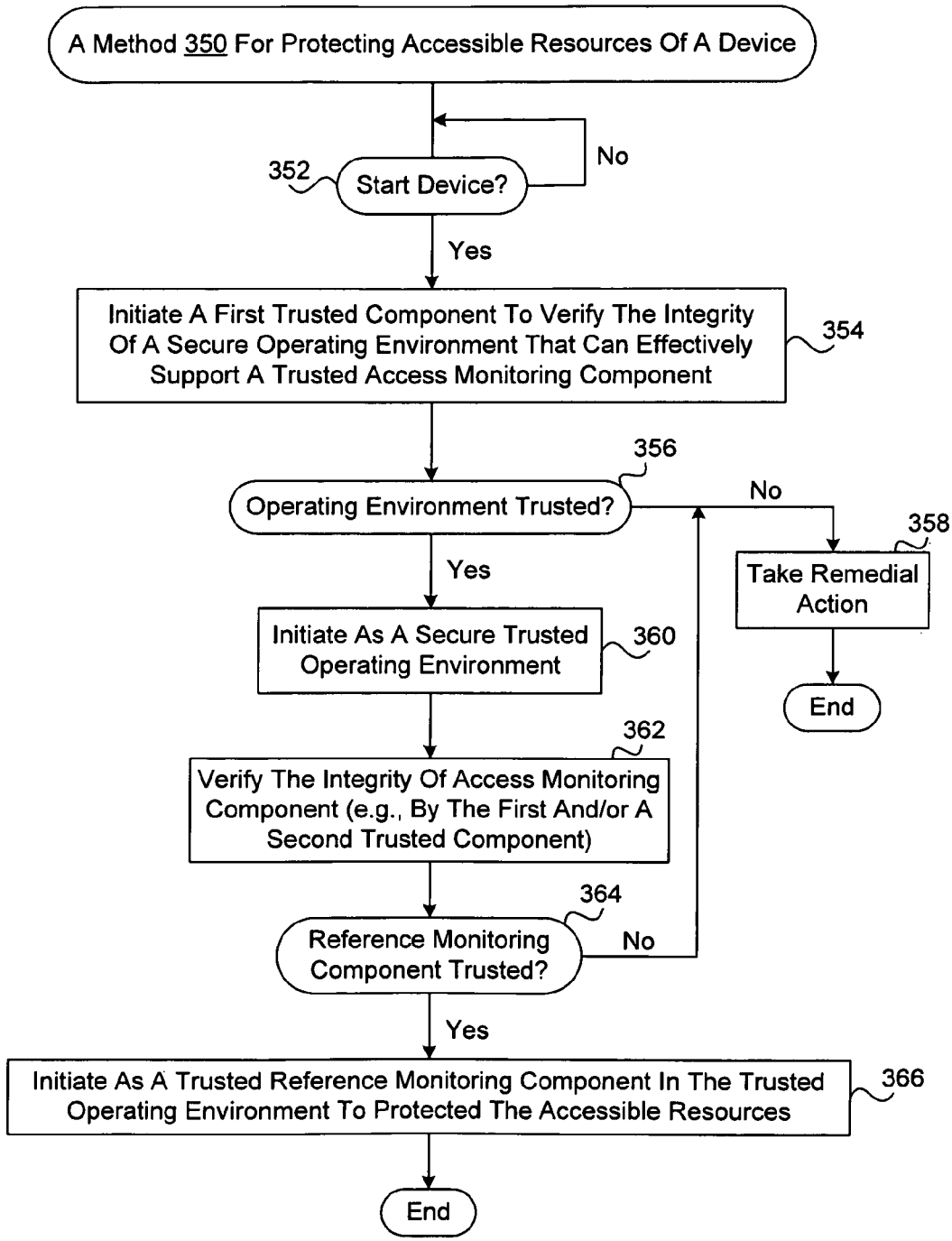
FIG. 3B depicts a method for protecting accessible resources of a device in accordance with one embodiment of the invention.

Referring now to FIG. 3B, a method for protecting accessible resources of a device is depicted in accordance with one embodiment of the invention. Initially, it is determined (352) whether the device is to be started. If it is determined (352) that the device is to be started, a first trusted component (e.g., a Trusted Platform Module) is initiated (354) to verify the integrity of an operating environment before allowing the operating environment to be initiated for the device. The operating environment can be provided as a secure operating system (e.g., a SELinux operating system) for a trusted access monitoring component which is operable to protect the accessible resources (or resources) of the device. The first trusted component can verify the integrity of the operating environment to effectively determine (356) whether the operating system can be trusted before it is initiated (360) as a trusted secure operating system on the device. If the first trusted component cannot successfully verify the integrity of the operating environment, remedial action can be taken (358), and the method 350 can end. By way of example, the device may not be allowed to start and/or an error message can be generated. However, if the first trusted component successfully verifies the integrity of the operating environment, the operating environment can be initiated as a trusted secure computing environment that can effectively support a trusted access monitoring component. However, before initiating an access monitoring component as a trusted access monitoring component (366), the integrity of the access monitoring component is verified (362). The integrity of the access monitoring component can, for example, be verified by the first trusted component and/or a second trusted component which its own integrity has been verified (e.g., a trusted boot loader can verify the integrity of the computer program code for a access monitoring component before allowing it to be initiated). In any case, if it determined (364) that the integrity of the access monitoring component is not successfully verified, remedial action can be taken (358) and the method 350 ends. On the other hand, if it is determined (364) that the integrity of the access monitoring component is successfully verified, the access monitoring component can be initiated as a trusted reference monitoring component in the trusted secure operating environment in order to protect the accessible resources of the device. It will be appreciated that the trusted reference monitoring component can be operable to control access to the accessible resources of the device.

Figure 3C:
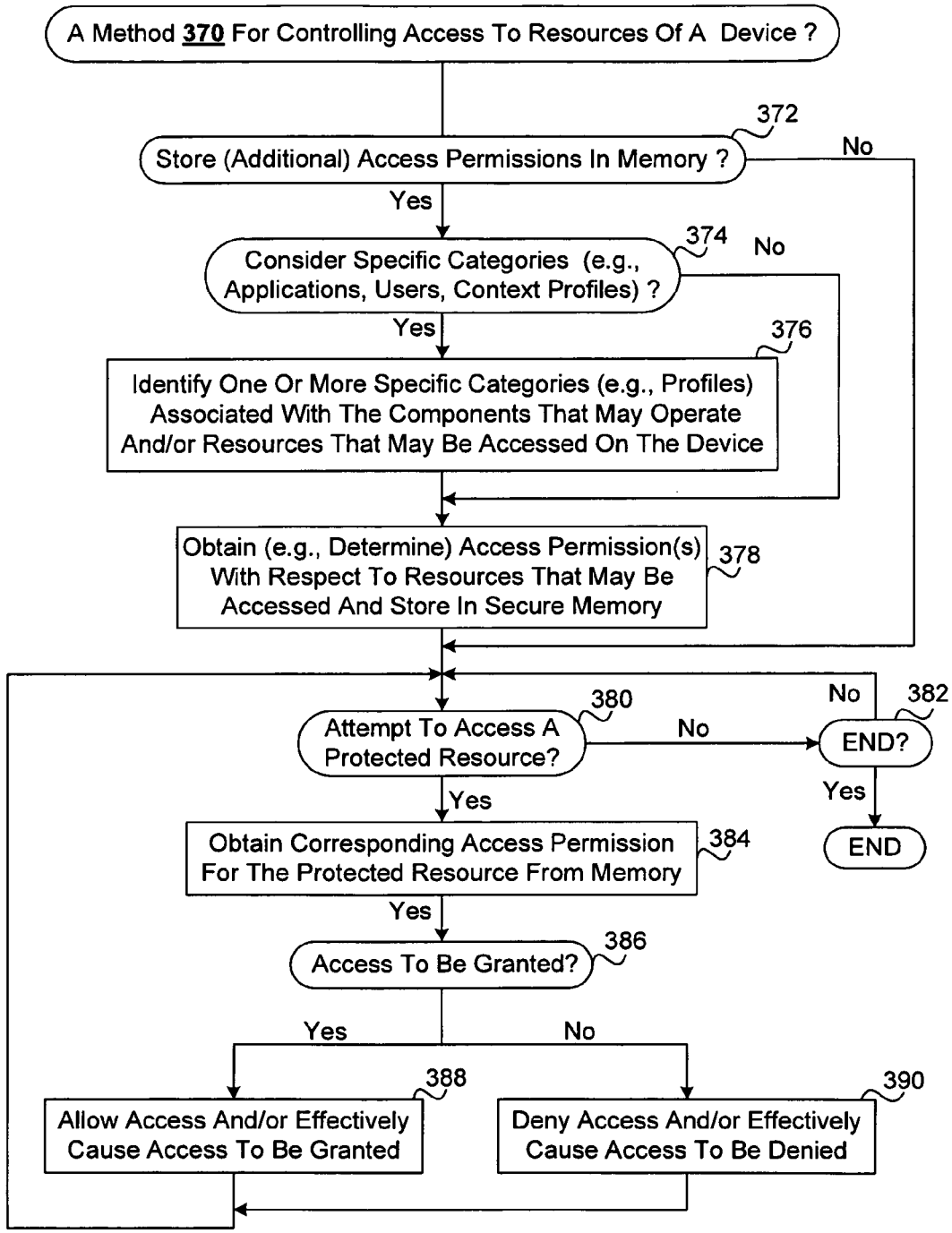
FIG. 3C depicts a method for controlling access to accessible resources (or resources) of a device in accordance with one embodiment of the invention.

To further elaborate, FIG. 3C depicts a method 370 for controlling access to accessible resources (or resources) of a device in accordance with one embodiment of the invention. The method 370 can, for example, be performed by a trusted reference monitoring component initiated in a secure operating environment in order to protect the accessible resources of the device in accordance with the embodiment depicted in FIG. 3A. Referring to FIG. 3B, initially, it is determined (372) whether to store one or more access permissions in memory. Generally, one or more access permissions can be stored as a first set of access permissions, be added to and/or replace access permissions already stored in memory. If it is determined (372) to store one or more access permissions, it is determined (374) whether to consider one or more specific categories (e.g., profiles). A specific category can, for example, represent an application, user, or a context profile that effectively identifies various components and/or the resources that the one or more components may attempt to access. As such, identifying (376) a specific category can result in identifying one or more access permissions that can be obtained (376). Those skilled in the art will readily appreciate that determining (376) of whether to consider a specific category of components and/or resources that may operate on the device can represent a design choice and/or a decision made based on one or more criteria (e.g., the current situation of the device, the applications currently loaded, history of components used). In any case, determining (372) whether to store one or more access permissions in memory, can generally result (378) in storing one on more access permissions regardless of whether a specific category is considered and identified (374 and 376) to effectively identify specific access permissions or alternative techniques are used to identify one or more access permissions to be stored (e.g., all of the possible access permissions are identified, a subset of all possible access permissions are stored, for example, based on the amount of memory available and/or other system variables including timing and performance requirements of the system).

Generally, if it is determined (372) to store access permissions in memory, one or more access permissions can be obtained (378) (e.g., determined, identified, selected, downloaded from a second storage, received from a trusted server). Thereafter, it is determined (380) whether an attempt to access a protected resource is being or has been made. In effect, the method 370 can wait for an attempt to access a protected resource to be made or end if it determined (382) to end the method 370, for example, as a result of a time out, or shutting down the control access mechanism for the device, and/or shutting down the device itself.

If it is determined (380) that an attempt to access a protected resource is being or has been made, one or more accessible permissions associated with the protected resource are obtained (384) from memory. The one or more accessible permissions effectively indicate whether to grant or deny access to the protected resource. As such, based on the one or more access permissions, it is determined (386) whether to grant or deny access to the protect resource, and access can be allowed and/or effectively caused to be granted (388) or denied and/or caused to be denied (390) accordingly. Thereafter, the method 370 can proceed to determine (380) whether an attempt is being or has been made to access a protected resource of the device in a similar manner as discussed above. The method 370 ends if it is determined (382) to effectively end controlling access to protected resources of the device.

Figure 4:
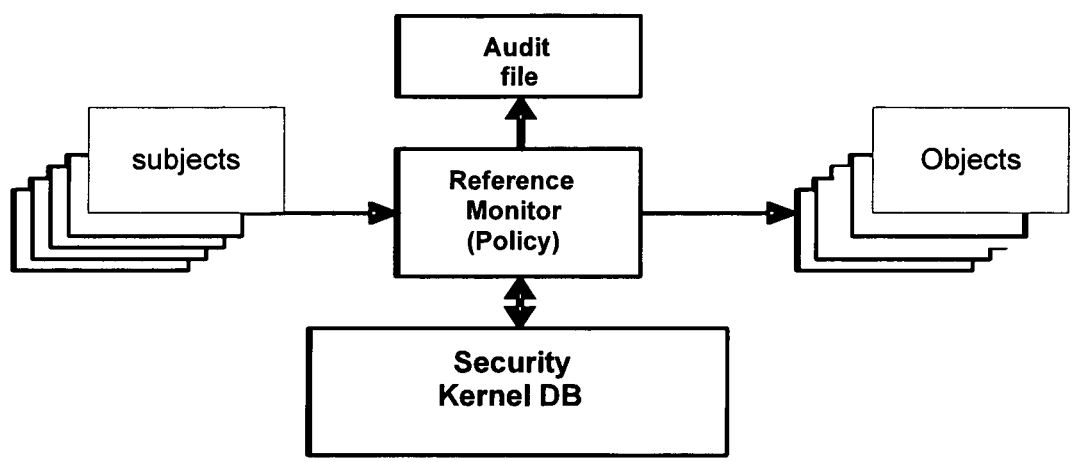
FIG. 4 depicts a reference monitoring architecture compatible with the techniques of the invention

As noted above, the trusted access monitoring manager 302a (shown in FIG. 3A) can serve as a reference monitor in accordance with one embodiment of the invention. To further elaborate, FIG. 4 depicts a reference monitoring architecture compatible with the techniques of the invention as will be known to those skilled in the art. Those skilled in the art will readily appreciate that various access control or reference monitoring techniques can be utilized in accordance with the invention as no specific assumptions need to be made regarding the architecture of the access control or reference monitoring utilized to make or use the invention. Secure operating system (e.g., SELinux Operating System) can offer additional advantages. In particular, the invention is especially well suited for SELinux Operating System because of the Mandatory Access Control (MAC) mechanism that it can provide. As such, the reference monitoring mechanisms of SELinux Operating System is described in greater detail below.

SELinux can associate "labels" of the form "user:role:type" to all "subjects" (e.g., processes) and "objects" (e.g., files, directories, programs, sockets). This "labeling" can be referred to as a "security context". Within the security context, the "type" attribute can represent the type of an "subject" and/or an "object" (e.g., sshd_t and syslogd_t, as generally known in the art). Instead of directly associating a user with a type, SELinux can associate a user with a "role" and a "role" with a set of types. The "role" can effectively simplify the management of various users supported by the SELinux Operating System. This means that access control in SELinux can be primarily enforced via a "Type-Enforcement" policy model, as is generally known in the art. A typical policy rule in SELinux can, for example, allow a particular type of subject to have a set of access permissions (or permissions) with respect with one or more other types of objects. By way of example, access permissions can be defined according to: object classes (e.g., file: {read, write}, append, lock, and netif: {tcp send,tcp recv}). As a simple example, the following rules can define two types: "qtmail_t and qtaddressbook_t" within a mobile device (e.g., a cell phone):

any subject of qtmail_t can have all permissions to any object of type qtaddressbook_t;

any subject of user_t only has the permission of getattr (e.g., can view the file with only with a listing (or "ls") command It should be noted that without defining additional access policy rules, "qtaddressbook_t" can be read and written by "qtmail_t subjects" (i.e., only processes with type "qtmail_t" (e.g., a normal email messaging process named "qtmail") are allowed to have full permissions on the resource of an address book (shown below).

```
type qtmail_t;
type qtaddressbook_t;
allow qtmail_t qtaddressbook_t:file *;
allow user_t qtaddressbook_t:file getattr;
```

In this way, an access control decision can be made based on the types of subjects and objects and the requested access operation.

To enhance the performance of a reference monitor, a SELinux Operating System can use a cache to effectively store the latest decisions made regarding access permissions.

However, partly due the large number of the types of subjects and objects, conventional SELinux systems operating on a typical Personal Computer (PC) or server-based platforms may have significant performance overhead. For example, the NSA SELinux example policy can have about 583 types, 55 classes, hundreds of possible operations, and over 10,000 policy rules. Due to large number of policy rules that need to be considered for numerous processes that can run concurrently, caching alone as limited benefits with respect to enhancing the performance.

However, on mobile and embedded devices, the number of processes that run concurrently is less that the typical Personal Computer (PC) or server-based platforms. For example, on a Motorola A1200 Linux-based Smartphone, typically a maximum of fifteen to twenty (15-20) distinct processes, including kernel modules, system services and daemons are concurrently executed (or run). In addition, access types may be defined based on the entities typically encountered in mobile and embedded devices. For example, consist with the architecture defined by Trusted Computing Group, a mobile phone reference monitoring (or access control) architecture can include domains (or engines) typically associated with entities (e.g., stakeholders) prevalent in a mobile computing environment. For example, only (4) domains (or engines) may be need for a mobile phone environment, namely, a manufacturer, a network provider, a service provider, and a user domain (or engine). As such, it will be appreciated that the techniques of the invention are especially suitable for mobile communication devices (e.g., mobile phones, Smartphone) because the benefits of the invention can be more readily realized.

It will also be appreciated that various domains (or engines) provided for various entities can be isolated from each other in a SELinux operating environment, as described in more detail in U.S. patent application Ser. No. 11/963,363. In particular, SELinux Operating System can be used to provide isolation between domains (or engines) such that an engine cannot directly access the resources of another engine—they can only communicate through dedicated and non-bypassable interfaces. An engine may have private trusted resources and normal resources, and can receive inputs from and provide outputs to other engines. In order to preserve strong isolations, two engines can only communicate through shared resources (i.e., interfaces). Consistent with Mobile Phone Reference Architecture developed by the Trusted Computing Group (TCG)—also known as TCG-MPRA, an "engine" can effectively generalize the concept of a "platform."

Figure 5:
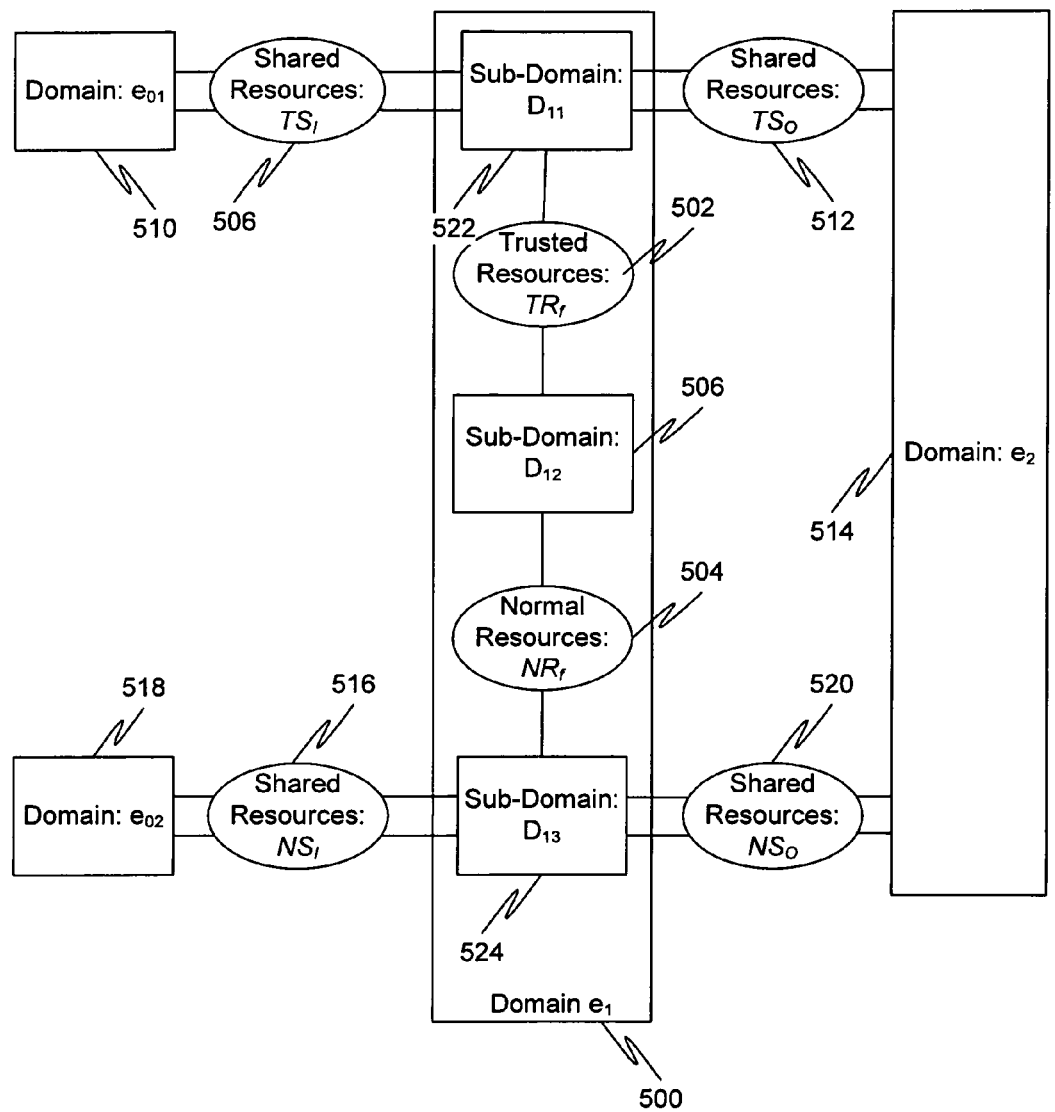
FIG. 5 is a diagram illustrating an example of the security policy.

FIG. 5 is a diagram illustrating an example of the security policy. In this policy, a generic engine $e_1$ is represented as a domain $500$, which has its private trusted resources ($TR_1$ $502$) and normal resources ($NR_1$ $504$). Internal trusted services can be accessed by the normal services, which is indicated by the sub-domain $D_{12}$ $506$ of $e_1$ $500$. Typical functions provided by trusted services to normal services include integrity measurement, secure storage, and monotonic counters. The information flow between these services can be one-way. Each engine may consume services provided by other engines and provide services to others. Both can have trusted resources and/or normal resources. These communications are represented by shared resources between $e_1$ and other engine domains. Specifically, domain $e_1$ $500$ can get trusted resources $TS_1$ $508$ from domain $e_{o1}$ $510$ and provide other trusted resources $TS_O$ $512$ to domain $e_2$ $514$. Similarly, $e_1$ $500$ can consume normal resources $NS_1$ $516$ from domain $e_{o2}$ $518$ and provide normal resources $NS_O$ $520$ to domain $e_2$ $514$. The one-way information flow indicates usage scenarios of communication between engines in accordance with an embodiment of the present invention. For example, an engine of a network carrier may provide cellular service to an engine of a third party service provider, and it does not consume any service from this engine. In more general scenarios, two-way information flow may be allowed if appropriate interfaces are defined.

A domain in the policy model of SELinux can be decomposed. In this approach, a generic engine $e_1$ can be represented as a domain, and it is decomposed into three sub-domains: the trusted domain $D_{11}$ $522$, the normal domain $D_{13}$ $524$, and the domain entrypoints $D_{12}$ $506$. At the same time, $D_{11}$ $522$ and $D_{13}$ $524$ act as the entities to communicate with external engines on trusted and normal services, respectively. Therefore, it is natural that each of these sub-domains can be further decomposed into a few sub-domains, each of which handles different communications between other internal and external domains. Note that domain $e_{01}$ $510$ and $e_{02}$ $518$ can belong to two distinct engines as well as the same engine. In the most general scenario, an engine can consume services from and provide services to the same or different engines. The actual details of possible domains and sub-domains and also the interactions between them depend on the exact implementations of the available engines on a platform and the service level agreements between different engines.

In traditional PC and server systems, a single system security administrator or the root has the ultimate control of the platform, and external entities have to trust the administrator and the policies deployed. On a mobile platform, the problem is different since multiple entities or stakeholders may be present.

Loadable policy modules supported by SELinux offer a flexible way to create self-contained policy modules that are linked to the existing policy without recompiling the entire policy source each time. A policy module can define private types and attributes and then define interfaces so that other modules can use them, thus enabling communication between the subjects whose types are defined in different modules. After a module is created, it can be loaded to the kernel during runtime using SELinux policy management infrastructure. Thus, capabilities to change and load policy modules can be defined and assigned to different administrative roles of different domains. Additionally, each domain has its own policy module where its internal resources can be defined with private types and only shared resources can be accessed through module interfaces by other policy writers (e.g., the administrative roles of other engines). This provides modularity and encapsulation for policy development and management, and self-protection for the security system.

SELinux architecture can include a Linux Security Module (LSM) $700$, which defines the placement of hook functions that are inserted into the Linux kernel. As a result, whenever a system call function is invoked by a process to access some resources (e.g., read/write a file or open a network connection), the corresponding SELinux LSM hooks can be invoked. These functions can check the SELinux LSM Module which in turn can communicate with an access monitoring system (e.g., trusted access monitoring system $302$ shown in FIG. 3) to make access decisions based upon loaded SELinux policies. The kernel can then effectively enforce the access decision to allow or deny an access operation.

Each resource in SELinux may be labeled with a single type. Similarly, each process may be labeled with a single domain, which may also be referred to as a SELinux "type." An access control decision may be determined by a policy, which includes a set of rules. Typically, a SELinux policy rule indicates that any process of a particular domain has a set of permissions to any resource of a particular type.

For example, the following rule states that any process of domain:

```
medical_t (e.g., /medical/exec) can do any operation to any file of type
medicalObject_t (e.g., any file in /medical/exec).
   ......
   /medical/exec -- medical_u : medical_r : medical_t
   /medical/db(/.*)? medicalObject_u: medicalObject_r:
   medicalObject_t;
   ......
   type medical_t;
   type medicalObject_t;
   role medical_r types medical_t;
   role medicalObject_r types medicalObject_t;
   user medical_u roles {medical_r};
   user medicalObject_u roles {medicalObject_r);
   allow medical_t medicalObject_t : file *;
```

Without any other rules indicating access to medicalObject_tfiles, this rule implies that only processes with domain medical_t can access medicalObject_t files, thus preventing any access from processes of other domains.

The domain of a process can be determined by the user who runs the program, or by the location (path) of the program file. Moreover, this can be defined by policy rules. Similarly, rules can be defined to confine the communication between processes from different domains, including executing/killing a process, sending messages to a process, and sharing resources (file, memory, or socket) between processes.

Integrity measurement and verification may also be integrated into a Linux-based system provided in accordance with the invention. For example, a series of services, including policy transformation, integrity verification, and sensor can run in user space. In the kernel space, a SELinux filesystem may provide interfaces to allow user space services to set values for conditional policies. When a policy is transformed, a set of files may be created in the filesystem. The integrity verification service may act to enforce usage control policies using input from an integrity measurement service that measures other runtime components. Measured events and integrity values may be stored in a measurement list and corresponding platform configuration registers in a trusted platform module may be extended accordingly.

An integrity measurement service may perform many different actions in monitoring the integrity of the policies. Specifically, a reference monitor may be measured after the kernel is booted. The client application, object, and configuration may be measured right before the client application is invoked. The integrity of individual policies, the policy transformation service, and the sensor may be measured when they are invoked and just before their execution. Mandatory Access Control (MAC) policies may be measured when they are loaded such as when the platform boots or if they are loaded at runtime. Additionally, any other applications or services that need to communicate or collaborate with the client application may be measured before they are invoked. This allows the integrity management service to monitor all other applications that interact with the sensitive client applications running on the same platform.

In order to enforce the policies, the integrity verification service may verify corresponding integrity values measured by the integrity measurement service and generate inputs to the reference monitor. As an example, a client application may only be allowed to access a target object when its "current" integrity corresponds to a known value. When a user logs in or attempts to access the object by invoking the client application, the user attributes may be checked by the reference monitor based upon the authentication of the user to the system (e.g., rile and necessary credentials of the user). When the client application is invoked by the user, it may be measured by the integrity measurement service prior to being loaded into memory. During runtime, if the client application generates an access request to the object, the integrity measurement service may measure the current integrity of the client application and pass that information to the integrity verification service. The integrity verification service may check the measured value against the known value and if they match, the client application can access the object. If not, then the client application cannot access the object. The decision as to whether the client application can or cannot access the object may then be passed to the reference monitor. The sensor service may monitor environmental information of the computing device (e.g., location) and provide these also to the reference monitor for policy evaluation when an access occurs on the platform with regard to the policies. Whenever there is a change of any information specified in the policies, the new information may be reported by the sensor service thus invoking the re-evaluation of the ongoing access.

The various aspects, features, embodiments or implementations of the invention described above can be used alone or in various combinations. The many features and advantages of the present invention are apparent from the written description and, thus, it is intended by the appended claims to cover all such features and advantages of the invention. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. A mobile device having a limited number of concurrently running processes, the mobile device including a trusted access monitoring system in a secure and trusted operation environment having Mandatory Access Control (MAC) capabilities for controlling access to one or more accessible components of a computing environment with the mobile device, wherein said access monitoring system is operable to:
   determine one or more accessible components of said mobile device that a first component may attempt to access, wherein said first component may attempt to access said one or more accessible components when said first component is operational on the mobile device;
   pre-process at least likely access permissions for the mobile device, including obtaining one or more access permissions based on a level of trust for said one or more accessible components, wherein said one or more access permissions effectively indicate whether said first component is allowed or not allowed to access said one or more accessible components; and
   store said one or more access permissions as pre-processed first one or more stored access permissions in a secure environment in kernel space of the mobile device in a manner that said first one or more access stored access permissions can be obtained if said first component attempts to access said one or more accessible components, thereby allowing access to said one or more accessible components to be controlled based on said stored access permissions.

2. The access monitoring system of claim 1, wherein pre-processing of access permissions includes:
   said determining of said one or more accessible components is performed when said first component is not fully operational on said mobile device, and aid obtaining of one or more access permissions comprises: determining said one or more access permissions when said first component is not fully operational for accessing said one or more accessible components, thereby allowing one or more access permissions for said first component to be pre-processed and alleviating the need to determine said one or more access permissions if said first component becomes fully operational and attempts to access said one or more accessible components of said mobile device.

3. The access monitoring system of claim 1, wherein said one or more accessible components are components of said mobile device.

4. The access monitoring system of claim 1, wherein said access monitoring system operates on said mobile device.

5. The access monitoring system 1,
wherein said one or more accessible components include one or more objects of a computing environment operating on said mobile device,
wherein said first component include a first subject of said computing environment operating on said mobile device, and
wherein said access monitoring system operates as a reference monitoring system to determine, based on said stored first one or more access permissions whether said first subject is allowed or not allowed to access said one or more objects.

6. The access monitoring system of claim 5,
wherein said one or more objects of said computing environment include one or more of the following:
one or more resources,
one or more shared resources;
one or more files, sockets, interfaces, and/or network connections,
one or more Inter-Process Communication (IPC) objects, message objects passing, synchronization objects, shared memory objects, and remote procedure calls (RPC) objects, and
wherein said one or more subjects of said computing environment include one or more of the following: one or more: executable components, processes, threads, applications, client applications, user applications, services, domains, and/or engines.

7. The access monitoring system of claim 1, wherein said obtaining of said one or more access permissions obtains said access permissions prior to said first device attempting to access said one or more accessible components.

8. The access monitoring system of claim 1, wherein said obtaining of said one or more access permissions comprises determining said one or more access permissions.

9. The access monitoring system of claim 1,
wherein said one or more accessible components are one or more components of said mobile device,
wherein said determining of said one or more accessible components comprises one or more of the following:
determining said one or more accessible components when said mobile device is started;
determining said one or more accessible components when said first component is initiated, loaded, launched and/or started on said mobile device;
wherein said obtaining of said one or more access permissions comprises one or more of the following:
determining said access permissions when said mobile device is started; and
determining said access permissions when said first component is initiated, loaded, launched and/or started on said mobile device.

10. The access monitoring system of claim 8, wherein said determining of said one or more access permissions determines all possible accessible components that said first component may access.

11. The access monitoring system of claim 1, wherein said determining of said one or more access permissions comprises:
determining one or more accessible components that said first component is likely to access as one or more potential accessible components.

12. The access monitoring system of claim 11, wherein said determining of said one or more accessible components which are likely to be accessed by said first component comprises one or more of the following:
selecting one or more accessible components that said first component has accessed and/or has attempted to access;
obtaining a first profile for said first component, wherein said first profile effectively indicates that said first component is likely to access said one or more potential accessible components; and
obtaining a second profile for a person associated with said component, wherein said second profile effectively indicates that said first component is likely to access said one or more potential accessible components; and
selecting one or more accessible components that said first component may access based on contextual information effectively representing a situation in which said one or more accessible components may be accessed.

13. The access monitoring system of claim 11, wherein said access monitoring system is further operable to define and/or update said one or more potential accessible components which are likely to be accessed by said first component based on observed behavior, preferences, and/or habits of a person who effectively uses said first component.

14. The access monitoring system of claim 1, wherein said access monitoring system is verified before allowing it to be initiated on said mobile device.

15. The access monitoring system of claim 1, wherein said obtaining of said one or more access permissions comprises:
verifying safety of said first component, and
determining said one or more access permissions based on said verification of safety of said first component.

16. The access monitoring system of claim 1, wherein said obtaining of said one or more access permissions further comprises:
verifying safety of said one or more accessible components, and
determining said one or more access permissions based on said verification of safety of said one or more accessible components.

17. The access monitoring system of claim 16, wherein said verifying of safety of said first component comprises one or more of the following:
verifying integrity of computer program code for said first component; and
verifying integrity of computer program code for said one or more accessible components.

18. The access monitoring system of claim 15,
wherein said access monitoring system is effectively provided for and/or by said first device, and
wherein said mobile device is operable to effectively initiate a trusted platform module which is operable to:
verify safety of said access monitoring system before allowing it to be initiated on said device, and
initiate and/or allow initiation of said access monitoring system only when said verifying verifies safety of said access monitoring system.

19. The access monitoring system of claim 16, wherein said trusted platform module comprises one or more of the following:
a Mobile Trusted platform Module (MTM), a Trusted Platform Module (TPM) provided as a Core Root of Trust Measurement (CRTM), and a Mobile Trusted platform Module (MTM) provided as a Core Root of Trust Measurement (CRTM).

20. The access monitoring system of claim 1, wherein said obtaining of said one or more access permissions comprises:
verifying safety of said first component, and
determining said one or more access permissions based on said verification of safety of said first component; and
wherein said determining of said one or more access permissions determines said access permissions based on a number of possible access types which is less than the number of possible access types available in server-based computing environments, thereby requiring less computations for determining all possible more access permissions than would be required in desk-top and server based computing environments.

21. The access monitoring system of claim 1, wherein said obtaining of said one or more access permissions comprises:
verifying safety of said first component, and
determining said one or more access permissions based on said verification of safety of said first component; and
wherein said number of possible access types is determined based on a number of domains including: a manufacturer domain type, a network provider domain type, a service provider domain type, and a user domain type.

22. The access monitoring system of claim 1, wherein said obtaining of said one or more access permissions comprises:
verifying safety of said first component, and
determining said one or more access permissions based on said verification of safety of said first component; and
wherein said determining of said one or more access permissions determines said access permissions based on access permissions assigned for a security context according to one or more following:
assigning a user to a type (user:type), and
assigning: a user to a role and said role to a type (user:role:type).

23. The trusted access monitoring system of claim 1, wherein said access monitoring system is effectively provided for and/or by said first device, and
wherein said first device is operable to effectively initiate a first safety component which is operable to:
verify safety of said access monitoring system before allowing it to be initiated on said mobile device, and
initiate and/or allow initiation of said access monitoring system only when said verifying verifies safety of said access monitoring system;
wherein said access monitoring system is further operable to:
determine a plurality of components that may be used on said mobile device, wherein said plurality of components include first and second components;
determine one or more accessible components that each of said plurality of components may attempt to access respectively;
pre-determine a set of access permissions for said plurality of components, wherein said set of access permissions effectively indicates whether said first and second components are allowed or not allowed to access their respective one or more accessible components; and
securely store said set of one or more access permissions, thereby allowing access to said one or more accessible components to be controlled based on access permissions that have been already determined for said plurality of components.

24. The access monitoring system of claim 1, wherein said access monitoring system is further operable to:
obtain at least one of said first one or more stored access permissions when said first component attempts to access at least one of said one or more accessible components; and
determine based on said at least one stored access permission whether to allow said first component to access said at least one accessible component.

25. The access monitoring system of claim 1, wherein said access monitoring system is further operable to effectively detect and/or be notified that said first component is attempting to access said one or more accessible components.

26. The access monitoring system of claim 23, wherein said determining of said plurality of components that may be used on said mobile device comprises:
determining a plurality of components that are likely to be used on said mobile device based on one or more of the following:
selecting a plurality of components that have previously used on said mobile device;
obtaining a first profile which effectively indicates that said plurality of components are likely to be used on said mobile device;
obtaining a user profile for a person using said device, wherein said user profile effectively indicates that said plurality of components are likely to be used on said mobile device; and
selecting said plurality of components based on contextual information effectively representing a situation.

27. A method for protecting accessible resources of a mobile device having a limited number of concurrently running processes, wherein said method comprises:
determining, using a trusted platform module, whether an access monitoring component is safe before allowing said access monitoring component to be initiated on said mobile device, wherein said determining of whether said access monitoring component is safe comprises:
verifying integrity of computer program code for said access monitoring component to effectively verify it as a trusted component; and
initiating said access monitoring component as a trusted access monitoring component only when said verifying verifies said integrity of said computer program code for said access monitoring component wherein said trusted access monitoring component
is operable to protect accessible resources of said device by effectively allowing access to said accessible resources to be granted or denied;
identify one or more executable components that may be executed on said mobile device;
identify one or more accessible resources that said one or more executable components may respectively try to access;
determine whether said one or more executable components and/or accessible resources are safe to effectively assess their safety;
pre-process based on said assessed safety of said one or more executable components and/or accessible resources, one or more access permissions that effectively indicate whether said one or more executable components are allowed or not allowed to access said one or more accessible resources; and store said one access permissions in kernel space for use by said trusted access monitoring component.

28. The method of claim 27, wherein said method further comprises:
verifying integrity of computer program code for said one or more executable components and/or accessible resources to effectively verify them as trusted components.

29. The method of claim 27, wherein said determining of whether said one or more executable components and/or accessible resources are safe comprises one or more of the following:
obtaining a safety level for said one or more executable components and/or accessible resources, wherein said safety level includes at least a safe level and an unsafe level;
determining, verifying, and/or assigning said safety level for said one or more executable components and/or accessible resources; and
obtaining a trustworthiness level for said one or more executable components and/or accessible resources, wherein said trustworthiness level includes at least a trusted level and an untrusted level.

30. The method of claim 29, wherein said identifying of one or more executable components that may be executed on said mobile device comprises one or more of the following:
identifying all the executable components that can be executed on said mobile device;
identifying one or more executable components that have executed on said mobile device;
obtaining a first profile which effectively indicates that said one or more executable components are likely to be used on said mobile device;
obtaining a user profile for a person using said device, wherein said second profile effectively indicates that said one or more executable components are likely to be used on said mobile device; and
identifying said one or more executable components based on contextual information effectively representing a situation in which said mobile device can be used.

31. The method of claim 29, wherein said identify of one or more accessible resources that said one or more executable components may respectively try to access comprises one or more of the following:
identifying all of the accessible resources available on said mobile device;
identifying all of the accessible resources that said one or more executable components may attempt to access on said mobile device;
identifying one or more accessible components that said one or more executable components have accessed and/or have attempted to access on said mobile device;
obtaining one or more profiles for said one or more executable components, wherein said one or more profiles effectively indicate that said one or more executable components are likely to access and/or attempt to access said one or more accessible resources; and
identifying said one or more accessible components based on contextual information effectively representing a situation in which said one or more accessible components may be accessed.

32. A method for providing access to accessible resources of a mobile device having a limited number of concurrently running processes, said method comprising:
identifying one or more applications that may be executed on said mobile device;
indentifying one or more accessible resources of said device that said one or more applications may attempt to access when executing on said mobile device
pre-processing based on one or more trust levels of one or more applications and/or accessible resources, one or more access permissions that effectively indicate whether said one or more applications are allowed or not allowed to access said one or more accessible resources of said mobile device; and
storing said one or more pre-determined access permissions as one or more stored access permissions in a secure storage in kernel space that is not accessible to said one or more applications but accessible to a trusted reference monitor operable to effectively allow or deny access to said one or more applications based on said one or more pre-determined access permissions, thereby allowing said trusted reference monitor to control access to accessible resources of said device based on said one or more stored access permissions.

33. The method of claim 32, wherein said method further comprises:
initiating a Trusted Platform Module (TPM) for said device;
verifying integrity of computer program code for a reference monitoring component before allowing it to be executed on said mobile device;
initiating a reference monitoring component as said trusted reference monitoring component only when said verifying verifies said integrity of computer program code for said reference monitoring component;
determining by said trusted reference monitor that at least one of said one or applications is requesting and/or attempting to access at least one of said one or accessible resources; and
determining by said trusted reference monitor based on at least one of said stored access permissions whether to allow or deny said at least one application access to said at least one accessible resource.

34. The method of claim 33,
wherein said trusted reference monitor operates in a kernel space of an operating system that is SELinux compliant; and
wherein said trusted reference monitor is operable to be effectively notified by one or more system monitoring components of said operating system that said at least one application program is requesting and/or attempting to access said at least one accessible resource via a Mandatory Access Control (MAC) mechanism which is also SELinux compliant.

35. The method of claim 34, wherein said one or more system monitoring components include one or more hooks provided for one or more operating system calls of said operating system.

36. A method for controlling access to one or more accessible components of a computing environment in a mobile device having a limited number of concurrently running processes, wherein said method comprises:
determining one or more accessible components that a first component may attempt to access, wherein said first component may attempt to access said one or more accessible components when said first component is operational on at the mobile device;
pre-processing one or more access permissions for said one or more accessible components, wherein said one or more access permissions effectively indicate whether said first component is allowed or not allowed to access said one or more accessible components; and securely storing said one or more access permissions in kernel space as first one or more pre-determined stored access permissions in a manner that said first one or more access stored permissions can be obtained if said first component attempts to access said one or more accessible components, thereby allowing access to said one or more accessible components to be controlled based on said stored one or more access permissions.

37. A non-transitory computer readable medium including computer program code for controlling access to one or more components accessible components of a mobile device computing environment having a limited number of concurrently running processes, wherein said computer program code includes:
  computer program code for determining one or more accessible components of said computing environment that a first component may attempt to access, wherein said first component may attempt to access said one or more accessible components when said first component is operational on at least a first device;
  computer program code for preprocessing one or more access permissions for said one or more accessible components, wherein said one or more access permissions effectively indicate whether said first component is allowed or not allowed to access said one or more accessible components; and
  computer program code for storing said one or more access permissions in kernel space as first one or more stored access permissions in a manner that said first one or more access stored permissions can be obtained if said first component attempts to access said one or more accessible components, thereby allowing access to said one or more accessible components to be controlled based on said stored one or more access permissions.

38. A mobile device having a limited number of concurrently running processes, the mobile device having a secure and trusted operation computing environment including Mandatory Access Control (MAC) capabilities, the mobile device comprising:
  an access monitoring system and an access storage, wherein said access monitoring system is operable to:
    determine one or more accessible components of said computing system that a first component may attempt to access;
    pre-process one or more access permissions for said one or more accessible components, wherein said one or more access permissions have levels of trust that effectively indicate whether said first component is allowed or not allowed to access said one or more accessible components; and
    securely store said one or more access permissions in said access storage in kernel space as first one or more pre-determined stored access permissions in a manner that said first one or more access stored permissions can be obtained if said first component attempts to access said one or more accessible components.

39. The mobile device of claim 38, wherein access monitoring system is operable to:
  retrieve said one or more access permissions from said access storage when said first component attempts to access said one or more accessible components;
  effectively indicate, based on said one or more access permissions, whether to grant or deny said first component access to said one or more accessible components.

40. The mobile device of claim 39, wherein said computing system is provided for a mobile and/or embedded device.

41. The mobile device of claim 39, wherein said computing system is provided for a mobile phone and/or Smartphone.

* * * * *